United States Patent
Soeno et al.

(10) Patent No.: US 7,477,485 B2
(45) Date of Patent: *Jan. 13, 2009

(54) INFORMATION RECORDING MEDIUM, RECORDING/REPRODUCING APPARATUS, AND STAMPER

(75) Inventors: Yoshikazu Soeno, Tokyo (JP); Takahiro Suwa, Tokyo (JP)

(73) Assignee: TDK Corporation, Tokyo (JP)

( * ) Notice: Subject to any disclaimer, the term of this patent is extended or adjusted under 35 U.S.C. 154(b) by 436 days.

This patent is subject to a terminal disclaimer.

(21) Appl. No.: 11/229,650

(22) Filed: Sep. 20, 2005

(65) Prior Publication Data

US 2006/0066975 A1    Mar. 30, 2006

(30) Foreign Application Priority Data

Sep. 24, 2004  (JP)  ............................. 2004-277304
May 16, 2005   (JP)  ............................. 2005-142375

(51) Int. Cl.
  *G11B 5/82* (2006.01)
  *G11B 5/09* (2006.01)
(52) U.S. Cl. ...................... 360/135; 360/48; 360/77.08
(58) Field of Classification Search .................. 360/48, 360/77.02, 77.08, 135
   See application file for complete search history.

(56) References Cited

U.S. PATENT DOCUMENTS

| | | | | |
|---|---|---|---|---|
| 4,016,603 A * | 4/1977 | Ottesen | ...................... | 360/135 |
| 6,014,296 A | 1/2000 | Ichihara et al. | | |
| 6,139,936 A * | 10/2000 | Weiss | ........................ | 428/141 |
| 6,154,330 A * | 11/2000 | Nakagawa | .................... | 360/48 |
| 6,324,032 B1 * | 11/2001 | Ohtsuka et al. | ............. | 360/131 |
| 6,421,195 B1 * | 7/2002 | Rubin et al. | .................. | 360/48 |
| 6,563,673 B2 * | 5/2003 | Mundt et al. | ................ | 360/135 |
| 7,193,796 B2 * | 3/2007 | Yasunaga | ..................... | 360/17 |
| 2005/0045583 A1 | 3/2005 | Fujita et al. | | |
| 2005/0117253 A1 | 6/2005 | Moriya et al. | | |

FOREIGN PATENT DOCUMENTS

| | | |
|---|---|---|
| JP | 3-130968 | 5/1991 |
| JP | 7-220404 | 8/1995 |

(Continued)

OTHER PUBLICATIONS

English Language Abstract of JP 2000-20945.

(Continued)

*Primary Examiner*—William J Klimowicz
(74) *Attorney, Agent, or Firm*—Greenblum & Bernstein, P.L.C.

(57) ABSTRACT

On an information recording medium, a data track pattern and a servo pattern composed of a concave/convex pattern including a plurality of convex parts are formed on at least one surface side of a substrate and respective concave parts in the concave/convex pattern are filled with non-magnetic material. The concave/convex pattern that constructs the servo pattern is divided into a plurality of ring-shaped regions that are concentric with the data track pattern and has a unit convex part length along a direction of rotation of the substrate set in each ring-shaped region so that a value produced by dividing an average length of the unit convex part length in each ring-shaped region by a distance from a center of the data track pattern to the ring-shaped region decreases from ring-shaped regions in an inner periphery to ring-shaped regions in an outer periphery.

16 Claims, 15 Drawing Sheets

FOREIGN PATENT DOCUMENTS

| | | |
|---|---|---|
| JP | 9-97419 | 4/1997 |
| JP | 2000-20945 | 1/2000 |
| JP | 2000-222725 | 8/2000 |
| JP | 2002-359138 | 12/2002 |
| JP | 2003-178431 | 6/2003 |
| JP | 2003228927 A * | 8/2003 |
| JP | 2004-171658 | 6/2004 |
| JP | 2004-342226 | 12/2004 |

OTHER PUBLICATIONS

English Language Abstract of JP 9-97419.
U.S. Appl. No. 11/085,522 to Takai et al., which was filed on Mar. 22, 2005.
U.S. Appl. No. 11/214,813 to Soeno et al., which was filed on Aug. 31, 2005.
U.S. Appl. No. 11/214,827 to Soeno et al., which was filed on Aug. 31, 2005.
U.S. Appl. No. 11/225,185 to Moriya et al., which was filed on Sep. 14, 2005.
English language Abstract of JP 2002-359138 Date: Dec. 13, 2002.
English language Abstract of JP 2003-178431 Date: Jun. 27, 2003.
English language Abstract of JP 2004-171658 Date: Jun. 17, 2004.
English language Abstract of JP 3-130968 Date: May 4, 1991.
English language Abstract of JP 2000-222725 Date: Aug. 11, 2000.
English language Abstract of JP 2004-342226 Date: Dec. 2, 2004.
English language Abstract of JP 7-220404 Date: Aug. 18, 1995.

* cited by examiner

INFORMATION RECORDING MEDIUM, RECORDING/REPRODUCING APPARATUS, AND STAMPER

BACKGROUND OF THE INVENTION

1. Field of the Invention

The present invention relates to an information recording medium where a data track pattern and a servo pattern are formed by a concave/convex pattern and respective concave parts in the concave/convex pattern are filled with non-magnetic material, a recording/reproducing apparatus equipped with such information recording medium, and a stamper for manufacturing such information recording medium.

2. Description of the Related Art

As one example of a recording/reproducing apparatus equipped with this kind of information recording medium, a magnetic recording apparatus equipped with a discrete track-type magnetic disk is disclosed by Japanese Laid-Open Patent Publication No. H09-97419. The magnetic disk is produced by forming concentric recording tracks ("belt-like convex parts") composed of a recording magnetic material ("magnetic material") on one surface side of a glass disc substrate ("substrate"). Guard band parts are also formed by filling spaces (concave parts) between the respective recording tracks with a guard band material (a non-magnetic material) to make the magnetic disk smoother and to magnetically separate adjacent recording tracks. When manufacturing such magnetic disks, first a magnetic material is sputtered onto one surface side of the substrate to form the recording magnetic layer. Next, after a positive-type resist has been spin-coated so as to cover the recording magnetic layer and prebaked, the same pattern as the guard band parts is drawn using a matrix cutting apparatus and then developed. By doing so, a resist pattern is formed on the recording magnetic layer. After this, the recording magnetic layer is etched using the resist pattern as a mask and mask residue is then removed by an ashing apparatus. By doing so, recording tracks and a servo pattern (convex parts) composed of magnetic material are formed on the substrate. After this, a non-magnetic material is sputtered onto the substrate in this state. When doing so, a sufficient amount of non-magnetic material is sputtered until the respective concave parts between the recording tracks are completely filled with the non-magnetic material and the respective recording tracks are covered with the non-magnetic material. Next, the surface of the sputtered non-magnetic material is dry-etched to expose the upper surfaces of the recording tracks from the non-magnetic material. By doing so, recording tracks and guard band parts become adjacent in an alternating manner, thereby completing the magnetic disk.

SUMMARY OF THE INVENTION

By investigating the conventional magnetic disk described above, the present inventors discovered the following problem. With the conventional magnetic disk, after the non-magnetic material is sputtered so as to cover the recording magnetic layer (the recording tracks), the non-magnetic material is dry-etched until the upper surfaces of the convex parts such as the recording tracks and the servo pattern are exposed, thereby smoothing the surface. However, when a magnetic disk is manufactured according to this method of manufacturing, there are cases where a large amount of non-magnetic material remains on the convex parts formed of the magnetic material (hereinafter, non-magnetic material remaining on the convex parts is also referred to as "residue") in an outer periphery of the magnetic disk, resulting in the convex parts being thickly covered with the non-magnetic material.

As a specific example, as shown in FIG. 29, a magnetic disk 10x manufactured according to a method of manufacturing described above is manufactured so that track pattern regions At, in each of which a concave/convex pattern 20t composed of a plurality of concentric recording tracks is formed, and servo pattern regions Asx, in which a concave/convex pattern 20sx for tracking servo purposes is formed, alternate in the direction of rotation (the direction of the arrow R in FIG. 29) of the magnetic disk 10x. In a recording/reproducing apparatus in which this type of magnetic disk is provided, the magnetic disk is normally rotated at a fixed angular velocity during recording and reproducing. Accordingly, on the magnetic disk 10x, the length of the servo pattern regions Asx along the direction of rotation of the magnetic disk 10x is set so as to become longer from the inner periphery of the magnetic disk 10x to the outer periphery (i.e., the servo pattern regions Asx widen toward the outer periphery of the magnetic disk 10x) in proportion to the length on the magnetic disk 10x that passes below a magnetic head (not shown) per unit time. More specifically, as shown in FIGS. 30 and 32, the length of an outer periphery servo pattern region Asxo in an outer periphery region Axo is greater than the length of an inner periphery servo pattern region Asxi in an inner periphery region Axi in proportion to a distance from a center O (see FIG. 29) of the concave/convex pattern 20t. Also, on this type of magnetic disk, at positions an equal distance from the center O, the unit length of convex parts (a reference length for which one convex part is detected when reading a magnetic signal: L1xi, L1xo in FIGS. 31 and 33) in the direction of rotation for convex parts 21sxi, 21sxo (hereinafter simply referred to as "convex parts 21sx" when no distinction is required) of the servo pattern regions Asx (the concave/convex pattern 20sx) is set equal to the unit length of concave parts (a reference length for which one concave part is detected when reading the magnetic signal: L2xi, L2xo in FIGS. 31 and 33) along the direction of rotation for concave parts 22sxi, 22sxo (hereinafter simply referred to as "concave parts 22sx" when no distinction is required). As a result, on the magnetic disk 10x, the ratio of the unit convex part length to the unit concave part length is 1 across the entire range from the inner periphery to the outer periphery.

Accordingly, as shown in FIGS. 31 and 33, on this magnetic disk 10x, the length L1xo of the convex parts 21sxo in the outer periphery servo pattern region Asxo is longer than the length L1xi of the convex parts 21sxi in the inner periphery servo pattern region Asxi in proportion to the distance from the center O of the concave/convex pattern 20t. The inventors have discovered a phenomenon whereby during the dry-etching of the non-magnetic material 15 to expose the respective convex parts 21sx, the greater the length of the convex parts 21sx present below the non-magnetic material 15 (i.e., the greater the width of the upper surfaces of the convex parts 21sx), the slower the etching of the non-magnetic material 15 proceeds. For this reason, as shown in FIG. 31, when etching is carried out for the entire region of the magnetic disk 10x from the inner periphery to the outer periphery with etching conditions set so that in the inner periphery servo pattern region Asxi where the length L1xi is comparatively short, the residue (the non-magnetic material 15) on the convex parts 21sxi is removed and the inner periphery of the magnetic disk 10x has favorable smoothness (the value of the surface roughness Ra is low, or the height difference Hxi between the convexes and the concaves is small), as shown in FIG. 33, comparatively thick residue (the non-magnetic material 15) is left on the convex parts 21sxo in the outer periphery servo pattern region Asxo where the length L1xo is comparatively long. Accordingly, when the non-magnetic material 15 is etched with such etching conditions, the surface roughness Ra (or the height difference Hxo between the convexes and concaves) in the outer periphery of the magnetic disk 10x becomes extremely large. In this way, for the conventional magnetic disk 10x, there has been the problem that due to the convex parts 21sxo being thickly covered with the non-magnetic material 15 in the outer periphery, the smoothness of the magnetic disk 10x deteriorates remarkably in the outer periphery (i.e., as the distance from the center O increases).

Also, for the conventional magnetic disk, during the manufacturing process, a resist pattern is formed by using a matrix cutting apparatus to draw an exposure pattern in a positive-type resist formed so as to cover the recording magnetic layer and then developing the resist. When doing so, since time is required to draw the exposure pattern, it is difficult to form the resist pattern (mask) for use during etching the recording magnetic layer in a short time. A faster method of producing the resist pattern is therefore desired.

The present invention was conceived to solve the problem described above and it is a principal object of the present invention to provide an information recording medium with favorable smoothness across an entire range from an inner periphery to an outer periphery thereof, a recording/reproducing apparatus equipped with an information recording medium with favorable smoothness, and a stamper that can easily form a concave/convex pattern for use during etching in a short time.

On an information recording medium according to the present invention, a data track pattern and a servo pattern composed of a concave/convex pattern including a plurality of convex parts are formed on at least one surface side of a substrate and respective concave parts in the concave/convex pattern are filled with non-magnetic material, wherein in the concave/convex pattern that constructs the data track pattern, the respective convex parts are formed concentrically or in a spiral, and the concave/convex pattern that constructs the servo pattern is divided into a plurality of ring-shaped regions that are concentric with the data track pattern and has a unit convex part length along a direction of rotation of the substrate set in each ring-shaped region so that a value produced by dividing an average length of the unit convex part length in each ring-shaped region by a distance from a center of the data track pattern to the ring-shaped region decreases from ring-shaped regions in an inner periphery to ring-shaped regions in an outer periphery. A recording/reproducing apparatus according to the present invention includes the information recording medium described above and a control unit that carries out servo control based on servo data corresponding to the servo pattern.

It should be noted that the expression "the respective convex parts in the concave/convex pattern that constructs the data track pattern may be formed concentrically or in a spiral" in the present specification includes a data track pattern of a patterned medium where convex parts as unit recording elements that are separated in both the radial direction and the direction of rotation of the information recording medium by concave parts in the concave/convex pattern are disposed concentrically or in a spiral. Also, the expression "unit convex part length" in this specification refers to a reference length for detecting that "one convex part is present" when reading a magnetic signal from an information recording medium. Accordingly, on an actual information recording medium, in accordance with the content of the servo data, the servo pattern is composed of convex parts of a length that is an integer multiple of the unit convex part length. Here, the reference length for detecting that "one convex part is present" may be set at a common length for the entire servo pattern or may be set at different lengths for the different types of pattern (preamble pattern, address pattern, burst pattern, and the like) that construct the servo pattern. In addition, normally the formation position of a convex part is detected as "output present for a detection signal" or "a high signal level for a detection signal". Also, the expression "distance from a center of the data track pattern to the ring-shaped region" in the present specification includes as examples not only the distance from the center of the data track pattern to the innermost position of the ring-shaped region and the distance from the center of the data track pattern to the outermost position of the ring-shaped region but also the distance from the center of the data track pattern to any position in the radial direction in the ring-shaped region, such as a center position. However, the position used for setting the distance is the same position in every ring-shaped region.

According to the above information recording medium and recording/reproducing apparatus, by forming the concave/convex pattern that constructs the servo pattern by setting the unit convex part length in each ring-shaped region so that a value produced by dividing the average length of the unit convex part length in each ring-shaped region by a distance to the ring-shaped region from a center of the data track pattern decreases from ring-shaped regions in an inner periphery to ring-shaped regions in an outer periphery, compared to the conventional magnetic disk 10x where a concave/convex pattern is formed so that the unit convex part length gradually increases from the inner periphery to the outer periphery, the unit convex part length can be sufficiently reduced in the ring-shaped regions in the outer periphery. Accordingly, when etching a layer of non-magnetic material formed so as to cover the respective convex parts, it is possible to avoid a situation where there is a large difference between the thickness of the residue on the respective convex parts in the ring-shaped regions in the outer periphery and the thickness of the residue on the respective convex parts in the ring-shaped regions in the inner periphery (that is, a large difference between the thickness of the residue on the convex parts in the inner periphery of the information recording medium and the thickness of the residue on the convex parts in the outer periphery of the information recording medium). Also, when the non-magnetic material is etched so that no non-magnetic material (residue) is left on the respective convex parts across the entire range from ring-shaped regions in the inner periphery to ring-shaped regions in the outer periphery, it is possible to remove the residue on the respective convex parts without causing a situation where in the ring-shaped regions in the inner periphery, the convex parts (the magnetic material) themselves are etched together with the non-magnetic material. By doing so, it is possible to maintain favorable smoothness for the information recording medium across the entire range of the information recording medium. For this reason, the flying height of a magnetic head above the information recording medium can be kept substantially equal across the entire range of the information recording medium, and therefore stabilized recording and reproducing can be carried out by a recording/reproducing apparatus equipped with this information recording medium.

On the information recording medium according to the present invention, the concave/convex pattern that constructs the servo pattern may be formed by setting the unit convex part length and a unit concave part length along the direction of rotation of the substrate so that a ratio of the unit convex part length to the unit concave part length decreases in each ring-shaped region from the inner periphery of the ring-shaped region to the outer periphery of the ring-shaped region. A recording/reproducing apparatus according to the present invention includes the information recording medium described above and a control unit that carries out servo control based on servo data corresponding to the servo pattern.

It should be noted that the expression "unit concave part length" in this specification refers to a reference length for detecting that "one concave part is present" when reading a magnetic signal from an information recording medium. Accordingly, on an actual information recording medium, in accordance with the content of the servo data, the servo pattern is composed of concave parts of a length that is an integer multiple of the unit concave part length. Here, the reference length for detecting that "one concave part is present" may be set at a common length for the entire servo pattern or may be set at different lengths for the different types of pattern (preamble pattern, address pattern, burst pattern, and the like) that construct the servo pattern. In addition, normally the formation position of a concave part is detected as "no output for a detection signal" or "a low signal level for a detection signal".

According to the above information recording medium and the recording/reproducing apparatus, by setting the unit convex part length and the unit concave part length so that the ratio of the unit convex part length to the unit concave part length decreases in each ring-shaped region from the inner periphery of the ring-shaped region to the outer periphery of the ring-shaped region, it is possible to sufficiently reduce the unit convex part length in the outer periphery of the respective ring-shaped regions. Accordingly, it is possible to keep the smoothness of the information recording medium favorable in each ring-shaped region across the entire range from the inner periphery of the ring-shaped region to the outer periphery of the ring-shaped region. For this reason, across the entire range in each ring-shaped region from the inner periphery of the ring-shaped region to the outer periphery of the ring-shaped region, the flying height of the magnetic head above the information recording medium can be kept substantially equal, and as a result, stabilized recording and reproducing can be carried out.

In addition, on the information recording medium according to the present invention, the concave/convex pattern that constructs the servo pattern may be formed with the unit concave part length set so as to increase in each ring-shaped region from the inner periphery of the ring-shaped region to the outer periphery of the ring-shaped region. A recording/reproducing apparatus according to the present invention includes the information recording medium described above and a control unit that carries out servo control based on servo data corresponding to the servo pattern.

According to the above information recording medium and the recording/reproducing apparatus, by setting the unit concave part length so as to increase in each ring-shaped region from the inner periphery of the ring-shaped region to the outer periphery of the ring-shaped region, unlike for example a structure where the unit concave part length is the same length in the ring-shaped regions across the entire range from the inner periphery of the ring-shaped region to the outer periphery of the ring-shaped region and the ratio of the unit convex part length to the unit concave part length decreases from the inner periphery of the ring-shaped region to the outer periphery of the ring-shaped region by changing the unit convex part length, it is possible to avoid a situation where the unit convex part length in the outer periphery of each ring-shaped region is excessively short. Accordingly, it is possible to reliably avoid the occurrence of read errors for a magnetic signal read from the convex parts in the outer periphery of the ring-shaped regions.

On an information recording medium according to the present invention, the concave/convex pattern that constructs the servo pattern may be formed by setting the unit convex part length in each ring-shaped region at an equal or substantially equal length in an entire range from the inner periphery of the ring-shaped region to the outer periphery of the ring-shaped region. A recording/reproducing apparatus according to the present invention includes the information recording medium described above and a control unit that carries out servo control based on servo data corresponding to the servo pattern.

It should be noted that for the present invention, even if extremely small manufacturing errors occur and there are slight fluctuations in the unit convex part length in the concave/convex pattern in any of the ring-shaped regions, such lengths are still included within the concept of "an equal length" (lengths in a predetermined range centered on a predetermined length that is the target for manufacturing). The expression "a substantially equal length" includes lengths in a tolerated range of a narrow width set in advance, the range being centered on a predetermined length that is the target for manufacturing and not relating to manufacturing errors.

According to the above information recording medium and recording/reproducing apparatus, by setting the unit convex part length in each ring-shaped region at an equal length across the entire range from the inner periphery of the ring-shaped region to the outer periphery of the ring-shaped region, it is possible to keep the thickness of the residue (non-magnetic material) formed on the convex parts (the magnetic material) in each ring-shaped region uniform across an entire range from the inner periphery of the ring-shaped region to the outer periphery of the ring-shaped region. Also, when the non-magnetic material is etched so as to not leave residue on the respective convex parts in the inner periphery of each ring-shaped region, it is possible to avoid the situation where the convex parts in the outer periphery of the ring-shaped regions are etched and the situation where residue is left on the convex parts in the outer periphery, and when the non-magnetic material is etched so as to not leave residue on the respective convex parts in the outer periphery of each ring-shaped region, it is possible to avoid the situation where the convex parts in the inner periphery of the ring-shaped regions are etched and the situation where residue is left on the convex parts in the inner periphery.

Also, on an information recording medium according to the present invention, the concave/convex pattern that constructs the servo pattern may be formed by setting a combined length of the unit convex part length and the unit concave part length so as to increase in each ring-shaped region from the inner periphery of the ring-shaped region to the outer periphery of the ring-shaped region in proportion to a distance from the center of the data track pattern. A recording/reproducing apparatus according to the present invention includes the information recording medium described above and a control unit that carries out servo control based on servo data corresponding to the servo pattern.

It should be noted that for the present invention, even if extremely small manufacturing errors occur and the combined length of the unit convex part length and unit concave part length in the concave/convex pattern in any of the ring-shaped regions slightly differs to a length that is proportional to the distance from the center of the data track pattern, such combined length of the unit convex part length and unit concave part length in the concave/convex pattern is still included within the concept of "a length in proportion to the distance from the center".

According to the above information recording medium and recording/reproducing apparatus, by setting the combined length of the unit convex part length and the unit concave part length (that is, the formation pitch of the convex parts and the concave parts) so as to increase in each ring-shaped region from the inner periphery of the ring-shaped region to the outer periphery of the ring-shaped region in proportion to the distance from the center of the data track pattern, it is possible to reliably read (detect) the servo data from the servo pattern in each ring-shaped region from the inner periphery of the ring-shaped region to the outer periphery of the ring-shaped region while rotating the information recording medium at a constant angular velocity and without changing, within the same ring-shaped region, the frequency used as a reference for a clock used when reading the servo data from a servo pattern region. Accordingly, since a frequency switching process for the read frequency information is not required when carrying out a seek operation for the magnetic head from the inner periphery to the outer periphery of a ring-shaped region, for example, seek operations can be carried out in a short time. For this reason, data can be accessed at high speed. Also, since it is sufficient to output a number of types of frequency information corresponding to the number of ring-shaped regions as the read frequency information, a tracking servo can be carried out by a control unit with a simple construction.

Also, on an information recording medium according to the present invention, in the concave/convex pattern that constructs the servo pattern, the unit convex part length may be set so as to increase in each ring-shaped region from the inner periphery of the ring-shaped region to the outer periphery of the ring-shaped region in proportion to a distance from the center of the data track pattern and the unit concave part length and the unit convex part length along the direction of rotation of the substrate may be set so that a combined length of the unit concave part length and the unit convex part length increases in each ring-shaped region from the inner periphery of the ring-shaped region to the outer periphery of the ring-shaped region in proportion to the distance from the center of the data track pattern. A recording/reproducing apparatus according to the present invention includes the information recording medium described above and a control unit that carries out servo control based on servo data corresponding to the servo pattern.

It should be noted that for the present invention, even if extremely small manufacturing errors occur and the unit convex part length in the concave/convex pattern in any of the ring-shaped regions slightly differs to a length that is proportional to the distance from the center of the data track pattern, such unit convex part length in the concave/convex pattern is still included within the concept of "a length in proportion to the distance from the center". Also, even if extremely small manufacturing errors occur and the combined length of the unit convex part length and the unit concave part length in the concave/convex pattern in any of the ring-shaped regions slightly differs to a length that is proportional to the distance from the center of the data track pattern, such combined length of the unit convex part length and the unit concave part length in the concave/convex pattern is still included within the concept of "a length in proportion to the distance from the center".

According to the above information recording medium and recording/reproducing apparatus, by setting the unit convex part length and the unit concave part length so that the unit convex part length increases in each ring-shaped region from the inner periphery of the ring-shaped region to the outer periphery of the ring-shaped region in proportion to a distance from the center of the data track pattern and the combined length of the unit convex part length and the unit concave part length so as to increase in each ring-shaped region from the inner periphery of the ring-shaped region to the outer periphery of the ring-shaped region in proportion to the distance from the center of the data track pattern, it is possible to avoid a situation where the unit convex part length increases in the ring-shaped regions in the outer periphery and to read the servo data without changing the frequency of the read frequency information in the same ring-shaped region, so that a frequency switching process for the read frequency information is not required when carrying out a seek operation for the magnetic head from the inner periphery to the outer periphery of a ring-shaped region, for example. Since a seek operation can be carried out in a short time, data can be accessed at high speed. Also, since it is sufficient to output a number of types of frequency information corresponding to the number of ring-shaped regions as the read frequency information, a tracking servo can be carried out by a control unit with a simple construction. Also, according to the above information recording medium and the recording/reproducing apparatus, the time taken for a convex part of the unit convex part length and a concave part of the unit concave part length to pass below the magnetic head can be made equal for the inner periphery and the outer periphery of the same ring-shaped region. Accordingly, it is possible to make the signal waveform of the unit convex part length and the unit concave part length of the servo data detected by the magnetic head equal across the entire range from the inner periphery to the outer periphery inside the same ring-shaped region. For this reason, the servo data can be read (detected) even more reliably.

Also, on an information recording medium according to the present invention, in the concave/convex pattern that constructs the servo pattern, an average length of the unit convex part length in each ring-shaped region may be set at an equal or substantially equal length in an entire range from ring-shaped regions in the inner periphery to ring-shaped regions in the outer periphery. A recording/reproducing apparatus according to the present invention includes the information recording medium described above and a control unit that carries out servo control based on servo data corresponding to the servo pattern.

It should be noted that for the present invention, even if extremely small manufacturing errors occur and the average length of the unit convex part length in the concave/convex pattern slightly fluctuates in the ring-shaped regions, such average length (lengths in a predetermined range centered on a predetermined length that is the target for manufacturing) is still included within the concept of "an equal length". The expression "a substantially equal length" includes lengths in a tolerated range of a narrow width set in advance, the range being centered on a predetermined length that is the target for manufacturing and not relating to manufacturing errors.

According to the above information recording medium and recording/reproducing apparatus, by setting the average length of the unit convex part length in each ring-shaped region at an equal or substantially equal length in an entire range from the ring-shaped regions in the inner periphery to the ring-shaped regions in the outer periphery, it is possible to favorably maintain the smoothness without fluctuations across the entire range of every ring-shaped region from the ring-shaped regions in the inner periphery to the ring-shaped regions in the outer periphery (that is, the entire range of the information recording medium). As a result, it is possible to keep the flying height of the magnetic head above the information recording medium uniform across the entire range of the information recording medium.

Also, on the information recording medium according to the present invention, the concave/convex pattern that constructs the servo pattern may be formed by setting the unit convex part length so that a value produced by dividing the unit convex part length by a distance from the center of the data track region decreases in each ring-shaped region from the inner periphery of the ring-shaped region to the outer periphery of the ring-shaped region. A recording/reproducing apparatus according to the present invention includes the information recording medium described above and a control unit that carries out servo control based on servo data corresponding to the servo pattern.

According to the above information recording medium and recording/reproducing apparatus, by setting the unit convex part length so that a value produced by dividing the unit convex part length by a distance from the center of the data track region decreases in each ring-shaped region from the inner periphery of the ring-shaped region to the outer periphery of the ring-shaped region, compared to the conventional magnetic disk 10x where the concave/convex pattern is formed so that the unit convex part length along the direction of rotation increases in proportion to the distance from the center of the data track pattern (so that a value produced by dividing the unit convex part length by the distance from the center of the data track pattern is equal across the entire range from the inner periphery of a ring-shaped region to the outer periphery of the ring-shaped region), it is possible to make the convex part length in the outer periphery in each ring-shaped region sufficiently short. Accordingly, when a layer of non-magnetic material formed so as to cover the respective convex parts is etched, it is possible to avoid a situation where in each ring-shaped region, the difference between the thickness of the residue on the convex parts in the outer periphery and the thickness of the residue on the convex parts in the inner periphery is large. In addition, when the non-magnetic material is etched so that no non-magnetic material (residue) is left on the respective convex parts in each ring-shaped region across the entire range from the inner periphery of the ring-shaped region to the outer periphery of the ring-shaped region, it is possible to remove the residue on the respective convex parts without causing a situation where in the inner periphery of each ring-shaped region, the convex parts (magnetic material) themselves are etched together with the non-magnetic material. Accordingly, the smoothness of the information recording medium can be favorably maintained in each ring-shaped region across the entire range from the inner periphery of the ring-shaped region to the outer periphery of the ring-shaped region. Since the flying height of the magnetic head above the information recording medium can be kept uniform in each ring-shaped region across the entire range from the inner periphery of the ring-shaped region to the outer periphery of the ring-shaped region, stabilized recording and reproducing can be carried out by a recording/reproducing apparatus.

In addition, on the information recording medium according to the present invention, in the concave/convex pattern that constructs the servo pattern, the unit concave part length may be set so that a value produced by dividing the unit concave part length along a direction of rotation of the substrate by a distance from the center of the data track region decreases in each ring-shaped region from the inner periphery of the ring-shaped region to the outer periphery of the ring-shaped region. A recording/reproducing apparatus according to the present invention includes the information recording medium described above and a control unit that carries out servo control based on servo data corresponding to the servo pattern.

According to the above information recording medium and the recording/reproducing apparatus, by forming the concave/convex pattern that constructs the servo pattern by setting the unit concave part length so that a value produced by dividing the unit concave part length by a distance from the center of the data track region decreases in each ring-shaped region from the inner periphery of the ring-shaped region to the outer periphery of the ring-shaped region, compared to a conventional information recording medium (the magnetic disk 10x) with a concave/convex pattern formed so that the unit concave part length along the direction of rotation of the substrate increases in proportion to the distance from the center of the data track pattern (so that a value produced by dividing the unit concave part length by the distance from the center is equal across the entire range from the inner periphery to the outer periphery), the unit concave part length in the outer periphery of each ring-shaped region can be sufficiently reduced. Here, the present inventors have discovered a phenomenon whereby at the positions of concave parts whose length along the direction of rotation is excessively long, the etching of non-magnetic material on convex parts formed on both sides of such concave parts proceeds slowly. On the other hand, according to this information recording medium, since the unit concave part length of the respective concave parts can be sufficiently reduced as described above, it is possible to etch the layer of non-magnetic material without causing the situation where the etching proceeds slowly on the non-magnetic material on the convex parts. As a result, it is possible to avoid the situation where in each ring-shaped region, there is a large difference between the thickness of the residue on the convex parts in the outer periphery and the thickness of the residue on the convex parts in the inner periphery. In addition, when the non-magnetic material is etched so that no non-magnetic material (residue) is left on the respective convex parts in each ring-shaped region across the entire range from the inner periphery to the outer periphery, it is possible to remove the residue on the respective convex parts without causing a situation where in the inner periphery of each ring-shaped region, the convex parts (magnetic material) themselves are etched together with the non-magnetic material. By doing so, it is possible to maintain the smoothness of the information recording medium even more favorably in each ring-shaped region across the entire range from the inner periphery of the ring-shaped region to the outer periphery of the ring-shaped region.

On an information recording medium according to the present invention, the concave/convex pattern that constructs the servo pattern may be formed by setting the unit convex part length at an equal or substantially equal length in an entire range in each ring-shaped region from the inner periphery of the ring-shaped region to the outer periphery of the ring-shaped region. A recording/reproducing apparatus according to the present invention includes the information recording medium described above and a control unit that carries out servo control based on servo data corresponding to the servo pattern.

It should be noted that even if extremely small manufacturing errors occur and the unit convex part length in the concave/convex pattern slightly fluctuates in any of the ring-shaped regions, such lengths (lengths in a predetermined range centered on a predetermined length that is the target for manufacturing) are still included within the concept of "an equal length". The expression "a substantially equal length" includes lengths in a tolerated range of a narrow width set in advance, the range being centered on a predetermined length that is the target for manufacturing and not relating to manufacturing errors.

According to the above information recording medium and recording/reproducing apparatus, by forming the concave/convex pattern that constructs the servo pattern by setting the unit convex part length at an equal length in an entire range in each ring-shaped region from the inner periphery of the ring-shaped region to the outer periphery of the ring-shaped region, it is possible to keep the etching conditions (etching rate) for the non-magnetic material on the respective convex parts (magnetic material) uniform across the entire range from the inner periphery of a ring-shaped region to the outer periphery of the ring-shaped region. Accordingly, it is possible to sufficiently reduce the difference between the thickness of the residue on the convex parts in the outer periphery of a ring-shaped region and the thickness of the residue on the convex parts in the inner periphery. Also, when the non-magnetic material is etched so as to leave no non-magnetic material (residue) on the respective convex parts across the entire range from the inner periphery to the outer periphery in each ring-shaped region, it is possible to remove the residue on the respective convex parts without causing a situation where in the inner periphery of the ring-shaped regions, the convex parts (magnetic material) themselves are etched together with the non-magnetic material. By doing so, it is possible to further improve the smoothness of the information recording medium and make the smoothness even more uniform across the entire range from the inner periphery to the outer periphery of each ring-shaped region. As a result, the flying height of the magnetic head above the information recording medium can be kept uniform in each ring-shaped region on the information recording medium across the entire range from the inner periphery of the ring-shaped region to the outer periphery of the ring-shaped region.

Also, on an information recording medium according to the present invention, the concave/convex pattern that constructs the servo pattern may be formed by setting the unit concave part length at an equal or substantially equal length in an entire range in each ring-shaped region from the inner periphery of the ring-shaped region to the outer periphery of the ring-shaped region. A recording/reproducing apparatus according to the present invention includes the information recording medium described above and a control unit that carries out servo control based on servo data corresponding to the servo pattern.

It should be noted that even if extremely small manufacturing errors occur and the unit concave part length in the concave/convex pattern slightly fluctuates in any of the ring-shaped regions, such lengths (lengths in a predetermined range centered on a predetermined length that is the target for manufacturing) are still included within the concept of "an equal length". The expression "a substantially equal length" includes lengths in a tolerated range of a narrow width set in advance, the range being centered on a predetermined length that is the target for manufacturing and not relating to manufacturing errors.

According to the above information recording medium and recording/reproducing apparatus, by forming the concave/convex pattern that constructs the servo pattern by setting the unit concave part length at an equal or substantially equal length in an entire range in each ring-shaped region from the inner periphery of the ring-shaped region to the outer periphery of the ring-shaped region, it is possible to keep the etching conditions (etching rate) for the non-magnetic material on the respective convex parts (magnetic material) formed on either side of the concave parts uniform across the entire range from the inner periphery of a ring-shaped region to the outer periphery of the ring-shaped region. Accordingly, it is possible to sufficiently reduce the difference between the thickness of the residue on the convex parts in the outer periphery of the ring-shaped region and the thickness of the residue on the convex parts in the inner periphery. Also, when the non-magnetic material is etched so as to leave no non-magnetic material (residue) on the respective convex parts across the entire range from the inner periphery to the outer periphery in each ring-shaped region, it is possible to remove the residue on the respective convex parts without causing a situation where in the inner periphery of each ring-shaped region, the convex parts (magnetic material) themselves are etched together with the non-magnetic material. By doing so, it is possible to further improve the smoothness of the information recording medium and make the smoothness even more uniform across the entire range from the inner periphery to the outer periphery of each ring-shaped region.

A recording/reproducing apparatus according to the present invention includes any of the information recording media described above and a control unit that carries out servo control by reading servo data corresponding to the servo pattern from the information recording medium based on read frequency information (frequency information that is a reference for a clock used when detecting (reading) the servo pattern) set in advance for each ring-shaped region.

According to the above recording/reproducing apparatus, by having the control unit read servo data corresponding to the servo pattern from the information recording medium based on read frequency information set in advance for each ring-shaped region, it is possible to reduce the number of frequency switching processes for the detection clock when a magnetic head carries out a seek operation from ring-shaped regions in the inner periphery to ring-shaped regions in the outer periphery of the information recording medium, for example. Since it is possible to carry out seek operations in a short time, data can be accessed at high speed.

Another recording/reproducing apparatus according to the present invention includes any of the information recording media described above and a control unit that carries out servo control by reading servo data corresponding to the servo pattern from the information recording medium based on read frequency information set in advance in accordance with the distance from the center of the data track pattern.

According to the above recording/reproducing apparatus, by having the control unit read servo data corresponding to the servo pattern from the information recording medium based on read frequency information set in advance in accordance with the distance from the center of the data track pattern, it is possible to reliably read the servo pattern (servo data) while rotating the information recording medium at a fixed angular velocity.

On a stamper according to the present invention, a concave/convex pattern is formed including convex parts formed corresponding to concave parts in the concave/convex pattern of any of the information recording media described above and concave parts formed corresponding to convex parts in the concave/convex pattern of such information recording medium.

According to the above stamper, by forming the concave/convex pattern with convex parts formed corresponding to the concave parts in the concave/convex pattern of any of the information recording media described above and concave parts formed corresponding to the convex parts in the concave/convex pattern of such information recording medium, unlike for example a method of manufacturing that forms the concave/convex pattern for use during etching (a concave/ convex pattern used as a mask when etching to form the servo pattern and the like) by using an electron beam lithography apparatus to draw an exposure pattern in a resin layer of a preform for manufacturing an information recording medium and then developing the exposure pattern, it is possible to easily form the concave/convex pattern for use during etching in a short time by merely pressing the concave/convex pattern of the stamper into the resin layer. It is also possible to form the concave/convex pattern for use during etching in a large number of preforms using a single stamper. Accordingly, the manufacturing cost of the information recording medium can be sufficiently reduced.

It should be noted that the disclosure of the present invention relates to a content of Japanese Patent Application 2004-277304 that was filed on 24 Sep. 2004 and of Japanese Patent Application 2005-142375 that was filed on 16 May 2005, the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of an information recording medium, a recording/reproducing apparatus, and a stamper according to the present invention will now be described with reference to the attached drawings.

Figure 1:
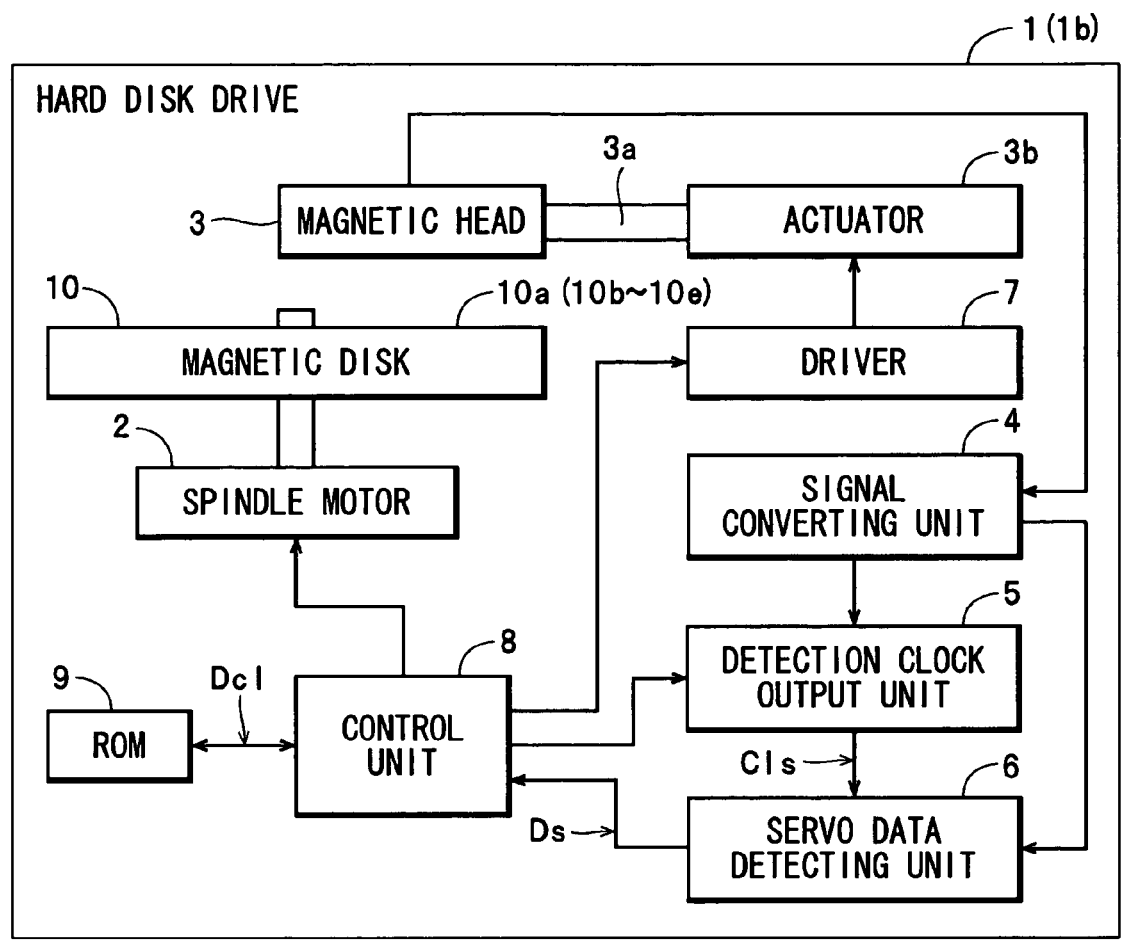
FIG. 1 is a block diagram showing the construction of hard disk drives.
Figure 2:
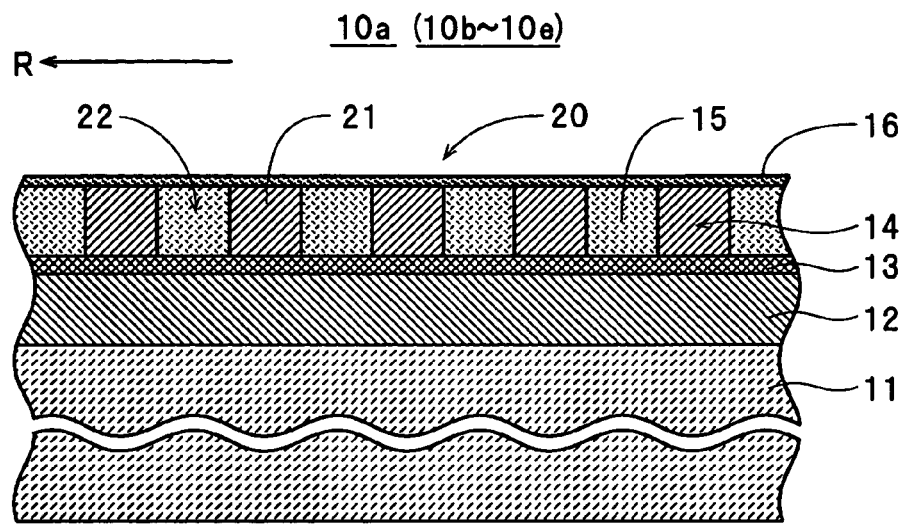
FIG. 2 is a cross-sectional view showing the multilayer structure of magnetic disks.

A hard disk drive 1 shown in FIG. 1 is a magnetic recording/reproducing apparatus as one example of a recording/reproducing apparatus according to the present invention and includes a spindle motor 2, a magnetic head 3, a signal converting unit 4, a detection clock output unit 5, a servo data detecting unit 6, a driver 7, a control unit 8, a ROM 9, and a magnetic disk 10a. Here, as one example, the magnetic disk 10a is a discrete track-type magnetic disc (patterned medium) on which recording data can be recorded by perpendicular recording, and corresponds to the information recording medium according to the present invention. More specifically, as shown in FIG. 2, the magnetic disk 10a is constructed so that a soft magnetic layer 12, an intermediate layer 13, and a magnetic layer 14 are formed in that order on a glass substrate 11. Here, the magnetic layer 14 formed on the intermediate layer 13 constructs a predetermined concave/convex pattern 20 by having convex parts 21 formed of a magnetic material and concave parts 22 alternately formed. The concave parts 22 are filled with a non-magnetic material 15 such as $SiO_2$. In addition, a thin film of diamond-like carbon (DLC), as one example, is formed by chemical vapor deposition (CVD) to produce a protective layer (DLC layer) 16 with a thickness of around 2 nm on the non-magnetic material 15 that fills the concave parts 22 and on the convex parts 21.

A lubricant (as one example, a fluoride lubricant) is also applied onto the surface of the protective layer 16 of the magnetic disk 10a.

The glass substrate 11 corresponds to a "substrate" for the present invention and is formed with a thickness of around 0.6 mm by polishing the surface of a glass plate with a diameter of 2.5 inches until the surface roughness is around 0.2 to 0.3 nm. It should be noted that the substrate for the present invention is not limited to a substrate of a glass material and it is possible to form the substrate of various types of non-magnetic material such as aluminum and ceramics. The soft magnetic layer 12 is formed with a thickness of around 100 nm to 200 nm by sputtering a soft magnetic material such as CoZrNb alloy. The intermediate layer 13 functions as an underlayer for forming the magnetic layer 14 and is formed with a thickness of around 40 nm by sputtering an intermediate layer forming material such as Cr or a non-magnetic CoCr alloy. The magnetic layer 14 is a layer composed of the convex parts 21 formed of the magnetic material. As described later, the convex parts 21 (the concave/convex pattern 20) are formed by carrying out a process that sputters a CoCrPt alloy, for example, and a process that forms the concave parts 22 by etching using a resist pattern or the like as a mask in that order.

Figure 3:
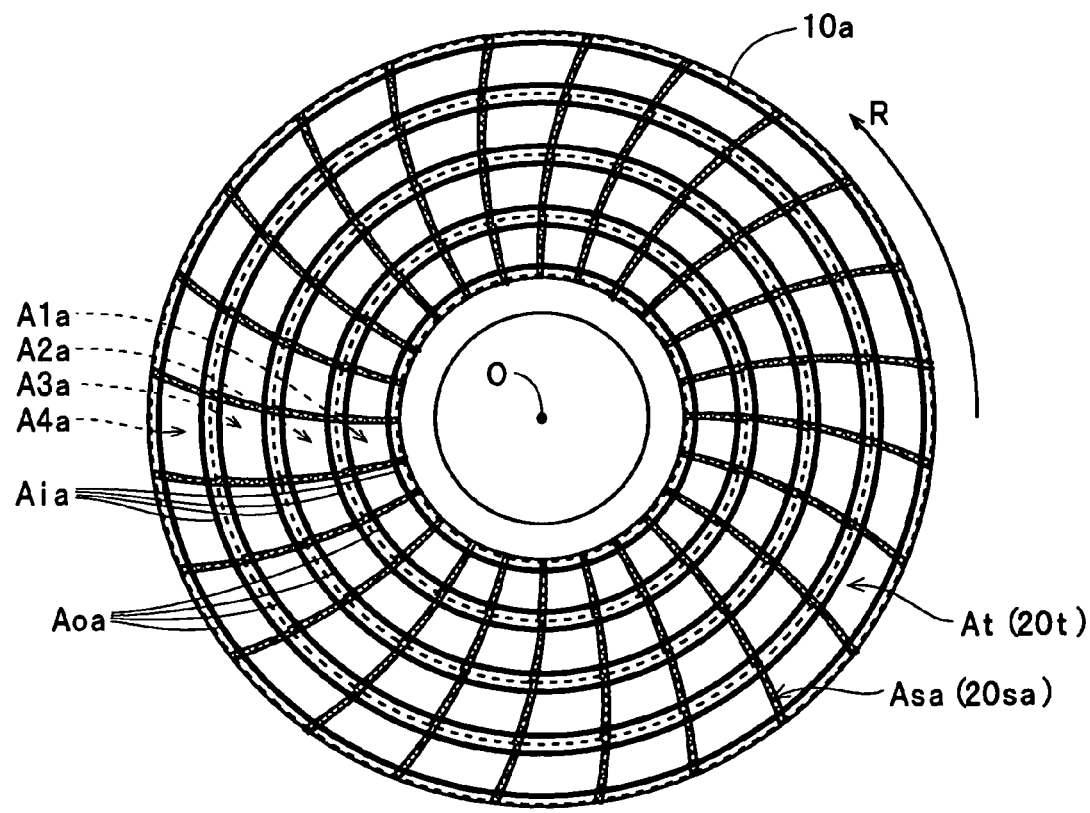
FIG. 3 is a plan view of a magnetic disk.

Here, as shown in FIG. 3, on the magnetic disk 10a, the concave/convex pattern 20 (a concave/convex pattern 20t, a concave/convex pattern 20sa) is formed so as to be divided into four ring-shaped regions A1a to A4a (one example of "a plurality of ring-shaped regions" for the present invention: hereinafter referred to as the "ring-shaped regions Aa" when no distinction is required) that are concentric and centered on a center O of the concave/convex pattern 20 (the concave/convex pattern 20t). That is, the "ring-shaped regions Aa" are concentric with the concave/convex pattern 20t. Note that the number of "the plurality of ring-shaped regions" for the present invention is not limited to four as in the above example, and the concave/convex pattern 20 can be divided into two or any higher number of regions from the inner periphery to the outer periphery of the magnetic disk 10a. Servo pattern regions As are also provided between track regions At on the magnetic disk 10a, with the track regions At and the servo pattern regions As being alternately disposed in the direction of rotation (the direction of the arrow R) of the magnetic disk 10a.

Figure 5:
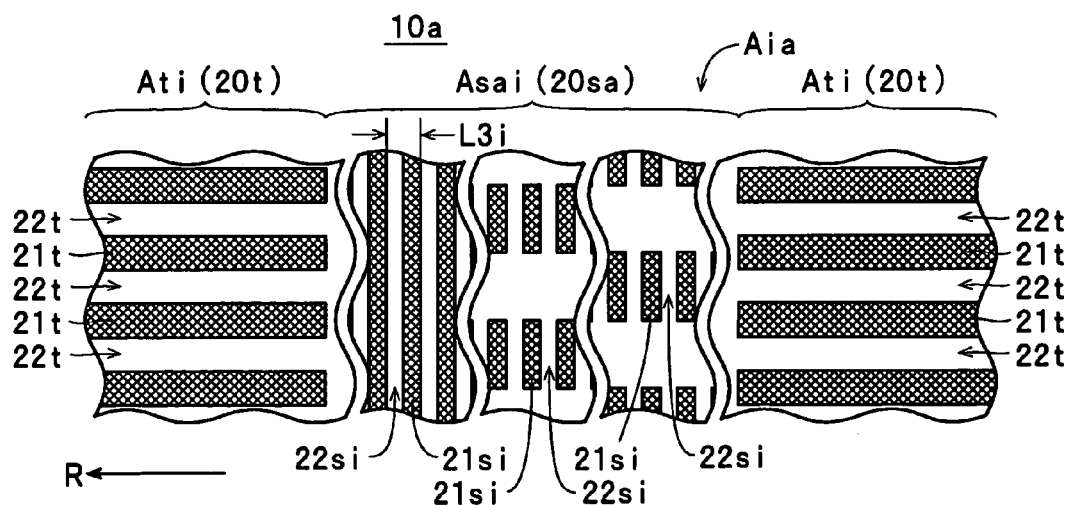
FIG. 5 is a plan view of the inner periphery region in a ring-shaped region.
Figure 7:
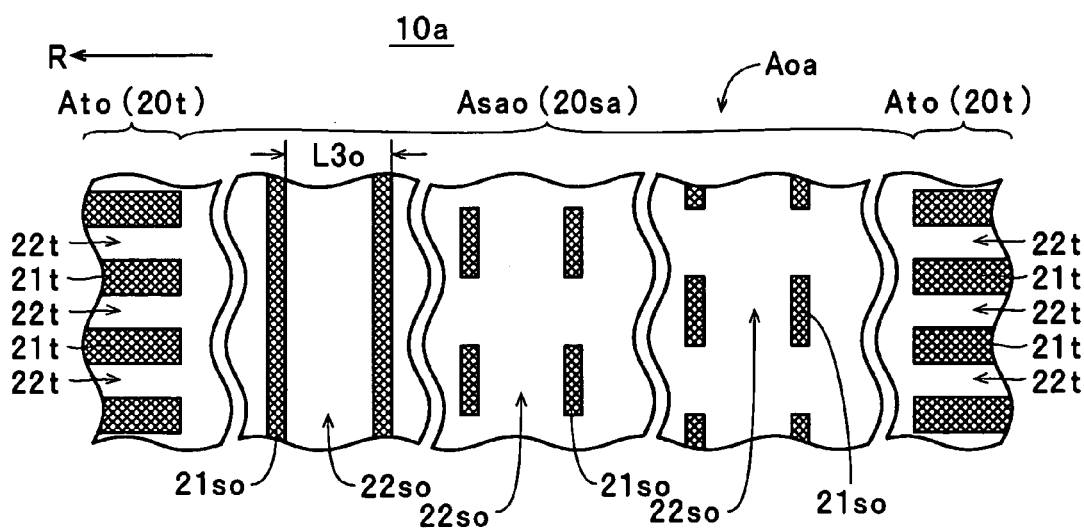
FIG. 7 is a plan view of an outer periphery region in the ring-shaped region.

Also, as shown in FIGS. 5 and 7, a concave/convex pattern 20t is formed as a data track pattern in the track pattern region At (an inner periphery track pattern region Ati in an inner periphery of each ring-shaped region Aa and an outer periphery track pattern region Ato in an outer periphery of each ring-shaped region Aa). Here, the concave/convex pattern 20t is composed of a plurality of concentric convex parts 21t (data recording tracks: also referred to hereinafter as "recording tracks") whose center O (see FIG. 3) is the center of rotation of the magnetic disk 10a and concave parts 22t present between the respective convex parts 21t. It should be noted that although it is preferable for the center O of the concave/convex pattern 20t to match the center of rotation of the magnetic disk 10a, in reality, there are cases where an extremely small displacement of around 30 to 50 μm is produced due to manufacturing error. However, since tracking servo control can still be performed sufficiently for the magnetic head 3 when a displacement of such magnitude is present, the center of rotation and the center O can be thought of as effectively matching. Also, the concave parts 22t of the concave/convex pattern 20t are filled with the non-magnetic material 15 to make the surface of the track pattern region At smooth.

Figure 4:
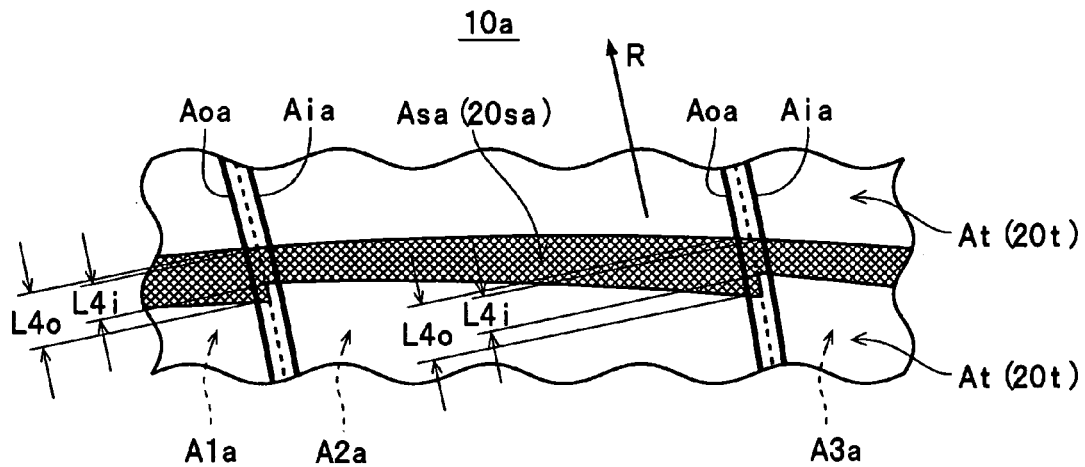
FIG. 4 is a plan view of a servo pattern region on the magnetic disk.

Also, as shown by FIGS. 4 to 8, a concave/convex pattern 20sa is formed as a servo pattern in servo pattern regions Asa (an inner periphery servo pattern region Asai in the inner periphery of each ring-shaped region Aa and an outer periphery servo pattern region Asao in the outer periphery of each ring-shaped region Aa). Here, as shown in FIGS. 5 to 8, the concave/convex pattern 20sa is composed of convex parts 21s (convex parts 21si and convex parts 21so) that construct various types of servo pattern such as a preamble pattern, an address pattern, and a burst pattern, and concave parts 22s (concave parts 22si and concave parts 22so). In addition, on the magnetic disk 10a, the combined length of the length of a convex part 21s and the length of a concave part 22s along the direction of rotation (the direction shown by the arrow R in the respective drawings), or in other words, the formation pitch of a convex part 21s and a concave part 22s, is set so as to gradually increase from the inner periphery to the outer periphery of each ring-shaped region Aa in proportion to the distance from the center O of the concave/convex pattern 20t. Accordingly, as shown in FIG. 4, in each ring-shaped region Aa, a length L4o along the direction of rotation in the outer periphery is slightly longer than a length L4i along the direction of rotation in the inner periphery.

In addition, on the magnetic disk 10a, the respective convex parts 21s are formed so that the length of the convex parts 21s along the direction of rotation is equal across the entire range from the inner periphery to the outer periphery in each ring-shaped region Aa (one example of a setting where "the unit convex part length is set at an equal or substantially equal length" for the present invention) and the respective concave parts 22s are formed so that the length of the concave parts 22s along the direction of rotation gradually increases from the inner periphery to the outer periphery in each ring-shaped region Aa. Accordingly, on the magnetic disk 10a, the ratio of the length of the convex parts 21s to the length of the concave parts 22s along the direction of rotation is set so as to gradually decrease in each ring-shaped region Aa from the inner periphery thereof to the outer periphery thereof. In addition, on the magnetic disk 10a, the length of the convex parts 21s is set equal across all of the ring-shaped regions Aa. As a result, on the magnetic disk 10a, the average length of the convex parts 21s in the respective ring-shaped regions Aa is equal in all of the ring-shaped regions Aa and a value produced by dividing the average length of the convex parts 21s in each ring-shaped region Aa by the distance from the center O of the concave/convex pattern 20t to the ring-shaped region Aa (as one example, the distance to the innermost position in the ring-shaped region Aa) decreases from the innermost ring-shaped region A1a to the outermost ring-shaped region A4a. Also, as shown in FIG. 4, on the magnetic disk 10a, the lengths L4i in the inner periphery of each ring-shaped region Aa are set equal and the lengths L4o in the outer periphery of each ring-shaped region Aa are also set equal.

Figure 6:
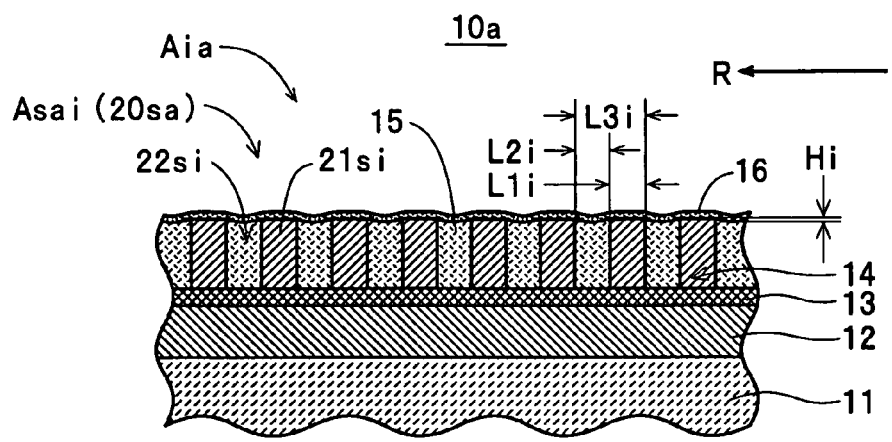
FIG. 6 is a cross-sectional view of an inner periphery servo pattern region in the inner periphery region.
Figure 8:
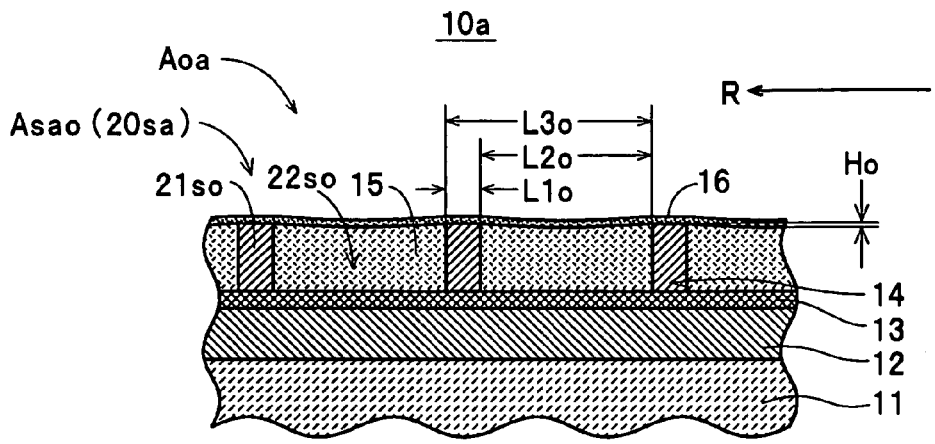
FIG. 8 is a cross-sectional view of an outer periphery servo pattern region in the outer periphery region.

More specifically, as shown in FIGS. 5 and 6, in an inner periphery region Aia (as one example, a preamble pattern formation region in the ring-shaped region A1a at a position 11 mm from the center O) in each ring-shaped region Aa, a length L3i that is the combined length of a length L2i of a concave part 22si (as one example, 220 nm) and a length L1i of a convex part 21si (as one example, 220 nm) is set at 440 nm. On the other hand, as shown in FIGS. 7 and 8, in an outer periphery region Aoa (as one example, a preamble pattern formation region in the ring-shaped region A1a at a position 16 mm from the center O) in each ring-shaped region Aa, a length L3o that is the combined length of a length L2o of a concave part 22so (as one example, 420 nm) and a length L1o of a convex part 21so (as one example, 220 nm which is equal to the length L1$i$ of the convex parts 21$si$) is set at 640 nm. As a result, as shown in FIG. 6, on the magnetic disk 10$a$, although the ratio of the length L1$i$ of a convex part 21$si$ to the length L2$i$ of a concave part 22$si$ in the concave/convex pattern 20$sa$ in the inner periphery region A$ia$ is 1, as shown in FIG. 8, the ratio of the length L1$o$ of a convex part 21$so$ to the length L2$o$ of a concave part 22$so$ in the outer periphery region A$oa$ is 11/21.

In this case, the ratio of the length of a convex part 21$s$ (the unit convex part length) to the length of a concave part 22$s$ (the unit concave part length) is set in the same way not only for the preamble pattern mentioned above but also for the concave/convex pattern 20$sa$ that constructs the address pattern and the burst pattern. Regarding the burst pattern, in a region where a plurality of oblong convex parts 21$s$ are disposed in lines on both sides of the concave parts 22$s$ along the direction of rotation of the magnetic disk 10$a$, the ratio of the unit convex part length to the unit concave part length is set so that the above conditions are satisfied. It should be noted that in FIGS. 7 and 8, for ease of understanding the present invention, the ratio of the length L1$o$ of the convex parts 21$so$ to the length L2$o$ of the convex parts 22$so$ is illustrated in an exaggeratedly small state (a state where the length of the concave parts is exaggeratedly large). Also, in FIGS. 5 to 8, the preamble pattern and burst pattern in the servo pattern are schematically illustrated and for ease of understanding, the lengths of the respective convex parts 21$s$ and the respective concave parts 22$s$ along the direction of rotation are illustrated using the unit convex part length and unit concave part length of the servo pattern only. Accordingly, on actual magnetic disks 10$a$, the number, formation positions, and lengths of the convex parts 21$s$ and the concave parts 22$s$ differ to the states shown in the respective drawings, and the concave/convex pattern 20$sa$ is formed with the number, formation positions, and lengths of the convex parts 21$s$ and the concave parts 22$s$ corresponding to the various types of control data including information (patterns) such as track addresses and sector addresses required for tracking servo control. In this case, the actual lengths of the convex parts 21$s$ and the concave parts 22$s$ are integer multiples of the lengths of the convex parts 21$s$ and the concave parts 22$s$ (i.e., integer multiples of the unit convex part length and the unit concave part length).

On the other hand, the spindle motor 2 rotates the magnetic disk 10$a$ at a fixed rotational speed, such as 4200 rpm, under the control of the control unit 8. As shown in FIG. 1, the magnetic head 3 is attached to an actuator 3$b$ via a swing arm 3$a$ and is moved above the magnetic disk 10$a$ during the recording and reproducing of recording data on the magnetic disk 10$a$. Also, the magnetic head 3 carries out reads of servo data from the servo pattern region A$sa$ in each ring-shaped region A$a$ of the magnetic disk 10$a$, magnetic writes of magnetic data in the track pattern region A$t$ (the convex parts 21$t$) in each ring-shaped region A$a$, and reads of recording data that has been magnetically written in the track pattern region A$t$ in each ring-shaped region A$a$. It should be noted that although an actual magnetic head 3 is formed on a base surface (air bearing surface) of a slider that causes the magnetic head to fly above the magnetic disk 10$a$, the slider has been omitted from this specification and the drawings. The actuator 3$b$ swings the swing arm 3$a$ by a driving current supplied from the driver 7 under the control of the control unit 8 and thereby moves the magnetic head 3 to an arbitrary recording/reproducing position above the magnetic disk 10$a$.

The signal converting unit 4 includes an amplifier, a low pass filter (LPF), an A/D converter, and the like (not shown), amplifies various signals obtained by the magnetic head 3 from the magnetic disk 10$a$, removes noise, and then carries out an A/D conversion and outputs digital data. The ROM 9 stores clock data Dc1 for read frequency information to be outputted by the control unit 8 for each ring-shaped region A$a$. Here, as described later, based on the clock data Dc1, the control unit 8 converts the frequency of the read frequency information so that the frequency increases as the magnetic head 3 is aligned with a recording track in a ring-shaped region A$a$ located further from the center O of the concave/convex pattern 20$t$, but does not change the frequency within the same ring-shaped region A$a$. The control unit 8 outputs the resulting frequency to the detection clock output unit 5. The detection clock output unit 5 obtains the read frequency information outputted by the control unit 8 based on the clock data Dc1 and obtains (detects), out of the digital data outputted from the signal converting unit 4, data (a signal) of a preamble read via the magnetic head 3 from the servo pattern region A$sa$ of the respective ring-shaped regions A$a$. In addition, based on the read frequency information and the preamble data, the detection clock output unit 5 adjusts the phase, frequency, and the like to generate and output to the servo data detecting unit 6 a detection clock signal Cls used when actually detecting the servo data.

Here, on the magnetic disk 10$a$, as described above, the concave/convex pattern 20$sa$ is formed so that the lengths L4$i$ in the respective ring-shaped regions A$a$ are equal and the lengths L4$o$ are also equal. This means that when the magnetic disk 10$a$ is rotated at a fixed angular velocity, the time that the servo pattern region A$sa$ passes below the magnetic head 3 decreases toward the ring-shaped regions A$a$ in the outer periphery. Accordingly, in a state where the magnetic disk 10 is rotated at a fixed velocity of 4200 rpm, for example, when the magnetic head 3 is kept aligned with a recording track (convex parts 21$t$) in the ring-shaped region A1$a$, the control unit 8 outputs read frequency information of 22 MHz, when the magnetic head 3 is kept aligned with a recording track (convex parts 21$t$) in the ring-shaped region A2$a$, the control unit 8 outputs read frequency information of 32 MHz, when the magnetic head 3 is kept aligned with a recording track in the ring-shaped region A3$a$, the control unit 8 outputs read frequency information of 42 MHz, and when the magnetic head 3 is kept aligned with a recording track in the ring-shaped region A4$a$, the control unit 8 outputs read frequency information of 52 MHz.

The servo data detecting unit 6 reads in synchronization with the detection clock Cls outputted from the detection clock output unit 5 to obtain (detect) servo data Ds from the digital data outputted from the signal converting unit 4 and outputs the servo data Ds to the control unit 8. The driver 7 controls the actuator 3$b$ in accordance with a control signal from the control unit 8 so that the magnetic head 3 is kept aligned with a desired recording track (the convex parts 21$t$). The control unit 8 carries out overall control of the hard disk drive 1. The control unit 8 specifies, based on head position information outputted from the servo data detecting unit 6, on which recording track in which ring-shaped region A$a$ in a range from the ring-shaped regions A$a$ in the inner periphery to the ring-shaped regions A$a$ in the outer periphery on the magnetic disk 10$a$ the magnetic head 3 is aligned, converts the read frequency information as described above in accordance with the clock data Dc1 (data on frequency converting conditions) set in advance for each ring-shaped region A$a$ and stored in the ROM 9 and in accordance with the desired position of the magnetic head 3 (the position of a ring-shaped region A$a$ and recording track to which the magnetic head 3 is to be moved), and outputs the read frequency information to the detection clock output unit 5. The control unit 8 also controls the driver 7 based on the servo data Ds outputted from the servo data detecting unit 6.

Next, the method of manufacturing the magnetic disk 10a will be described with reference to the drawings.

Figure 9:
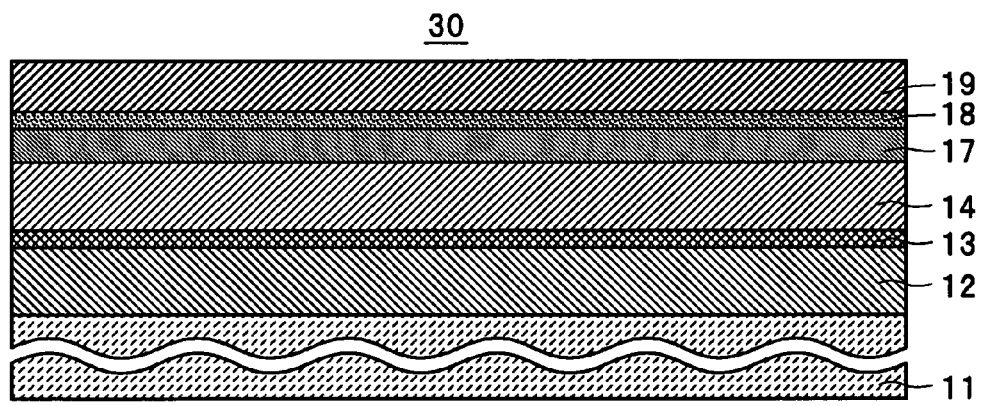
FIG. 9 is a cross-sectional view of a preform for manufacturing the magnetic disk.
Figure 10:
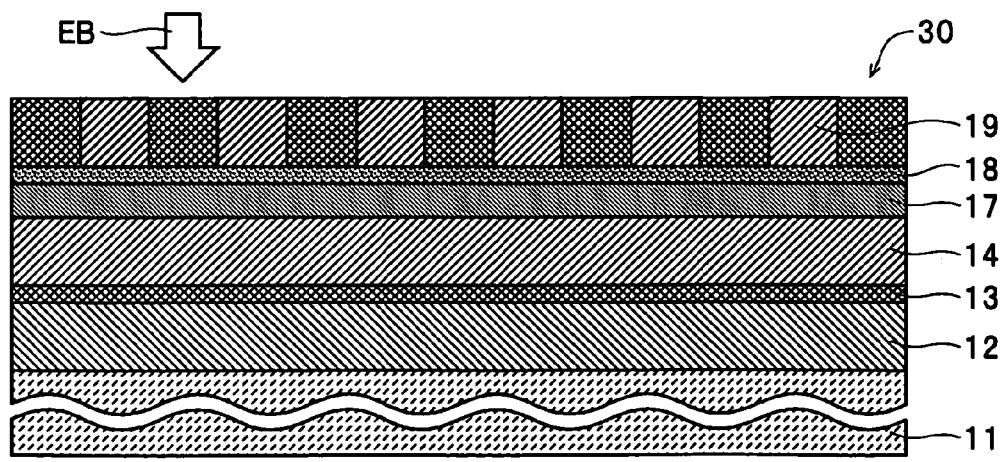
FIG. 10 is a cross-sectional view of the preform in a state where an exposure pattern has been drawn on a resin layer by irradiation with an electron beam EB.
Figure 11:
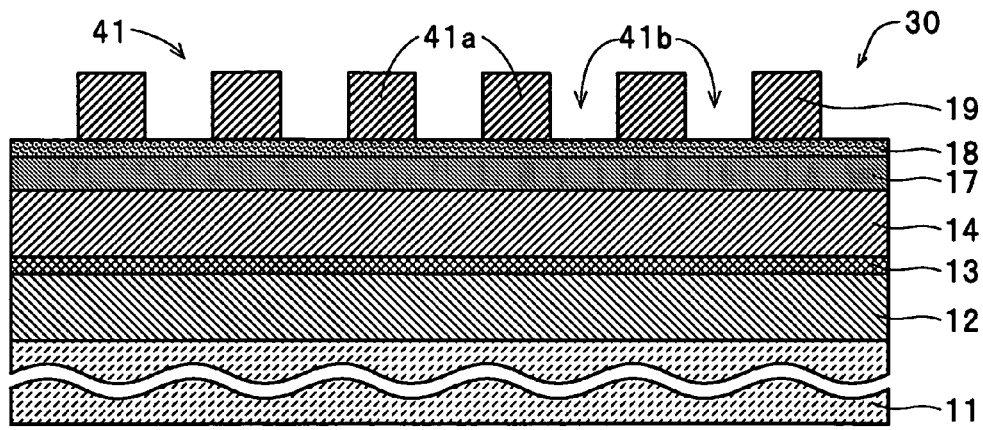
FIG. 11 is a cross-sectional view of the preform where the resin layer in the state shown in FIG. 10 has been developed or where a concave/convex pattern of a stamper has been transferred to the resin layer.

First, after the soft magnetic layer 12 has been formed by sputtering CoZrNb alloy on the glass substrate 11, the intermediate layer 13 is formed by sputtering an intermediate layer forming material on the soft magnetic layer 12. Next, by sputtering CoCrPt alloy on the intermediate layer 13, the magnetic layer 14 is formed with a thickness of around 15 nm. After this, a C (carbon) mask layer 17 is formed on the magnetic layer 14 with a thickness of around 12 nm by sputtering, for example, and an Si mask layer 18 is formed on the C mask layer 17 with a thickness of around 4 nm by sputtering. Next, a positive-type electron beam resist is spin coated on the Si mask layer 18 to form a resin layer 19 (mask forming functional layer) with a thickness of around 130 nm. By doing so, as shown in FIG. 9, a preform 30 for manufacturing the magnetic disk 10a is completed. Next, as shown in FIG. 10, an electron beam EB is emitted onto the preform 30 using an electron beam lithography apparatus to draw an exposure pattern with the same planar shape as the concave/convex pattern 20sa and the concave/convex pattern 20t on the resin layer 19. After this, by developing the resin layer 19 on which the drawing of the exposure pattern has been completed, as shown in FIG. 11, a concave/convex pattern 41 (resist pattern) is formed on the Si mask layer 18.

Figure 12:
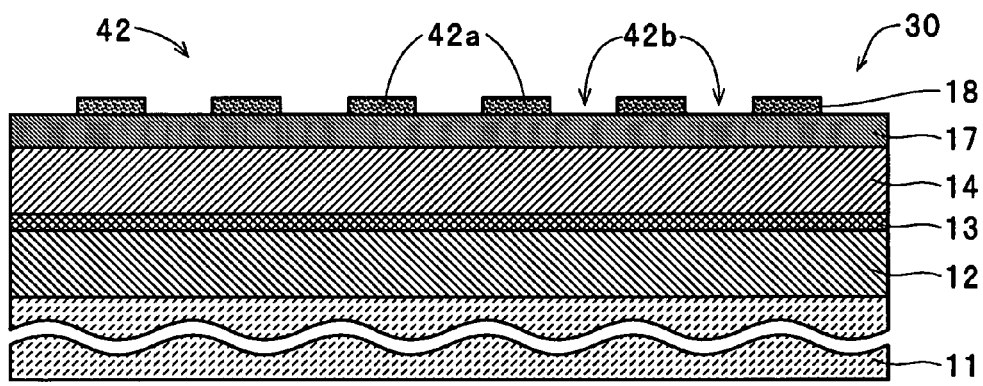
FIG. 12 is a cross-sectional view of the preform in a state where an Si mask layer has been etched with another concave/convex pattern as a mask to form still another concave/convex pattern (Si mask) on a C mask layer.
Figure 13:
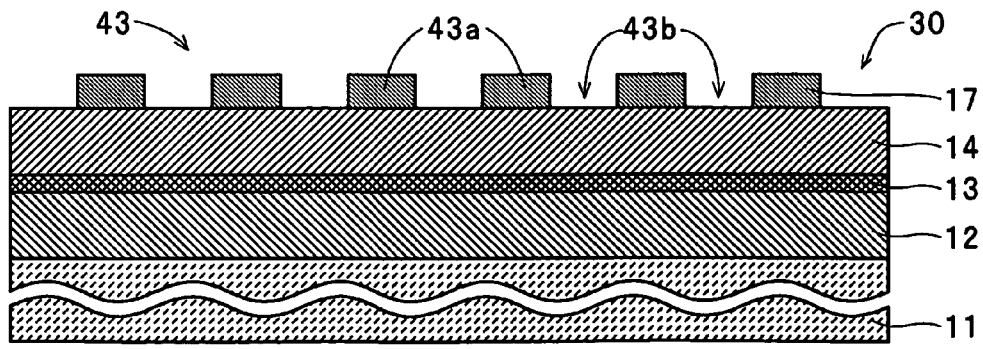
FIG. 13 is a cross-sectional view of the preform in a state where the C mask layer has been etched with the still another concave/convex pattern as a mask to form a further concave/convex pattern (C mask) on a magnetic layer.
Figure 14:
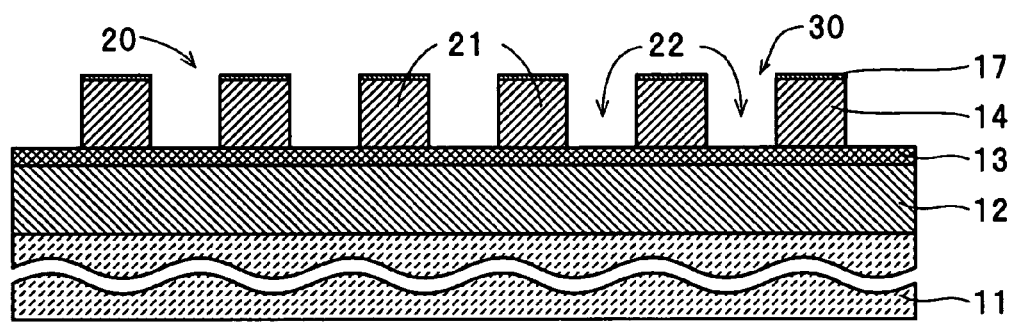
FIG. 14 is a cross-sectional view of the preform in a state where the magnetic layer has been etched with the further concave/convex pattern as a mask to form a still further concave/convex pattern on an intermediate layer.

Next, by carrying out ion beam etching with argon (Ar) gas using the concave/convex pattern 41 (the resin layer 19) as a mask, the Si mask layer 18 exposed by the mask (convex parts 41a) at the bottoms of the concave parts 41b in the concave/convex pattern 41 is etched to form a concave/convex pattern 42 (Si mask pattern) in the Si mask layer 18 as shown in FIG. 12. After this, reactive ion etching is carried out with oxygen gas as the reactive gas and the concave/convex pattern 42 as a mask to etch the C mask layer 17 exposed from the mask (convex parts 42a) at the bottoms of the concave parts 42b in the concave/convex pattern 42 to form a concave/convex pattern 43 (C mask pattern) in the C mask layer 17 as shown in FIG. 13. Next, ion beam etching is carried out using argon (Ar) gas and the concave/convex pattern 43 as a mask. By doing so, as shown in FIG. 14, the positions in the magnetic layer 14 that were covered by the mask pattern (positions covered by convex parts 43a of the concave/convex pattern 43) become the convex parts 21 and positions exposed from the mask pattern (positions that were exposed at the bottoms of concave parts 43b of the concave/convex pattern 43) become the concave parts 22, thereby forming the concave/convex pattern 20 (the concave/convex patterns 20sa and 20t) on the intermediate layer 13. Next, by carrying out reactive ion etching of the C mask layer 17 (the C mask pattern) remaining on the convex parts 21 with oxygen gas as the reactive gas, the upper surfaces of the convex parts 21 are exposed (the remaining C mask layer 17 is removed).

Next, while a bias power of around 150 W for example is applied to the preform 30, $SiO_2$ as the non-magnetic material 15 is sputtered with the pressure of the argon (Ar) gas set at 0.3 Pa, for example. At this time, a sufficient amount of the non-magnetic material 15 is sputtered to completely fill the concave parts 22 with the non-magnetic material 15 and form a layer of non-magnetic material 15 with a thickness of around 60 nm, for example, on the upper surfaces of the convex parts 21. Here, by sputtering the non-magnetic material 15 in a state where bias power is applied to the preform 30, a layer of non-magnetic material 15 is formed without producing large convexes and concaves on the surface. Next, ion beam etching is carried out on the layer of the non-magnetic material 15 on the magnetic layer 14 (on the convex parts 21, on the concave parts 22, and inside the concave parts 22) in a state where the pressure of the argon (Ar) gas is set at 0.04 Pa, for example, and where the incident angle of the ion beam on the surface of the preform 30 (the layer of the non-magnetic material 15) is set at 2°. At this time, the ion beam etching continues until the upper surfaces of the respective convex parts 21si in the inner periphery in each ring-shaped region Aa (the positions that will later become the inner periphery region Aia) of the preform 30 are exposed from the non-magnetic material 15.

Here, on the magnetic disk 10a (the preform 30), the length L1$i$ of the convex parts 21si in the inner periphery inside each ring-shaped region Aa and the length L1$o$ of the convex parts 21so in the outer periphery of each ring-shaped region Aa are formed at an equal length (in this example, 220 nm). Also, on the magnetic disk 10a, the length L1$i$ of the convex parts 21si of all of the ring-shaped regions A1a to A4a (that is, the entire range of the magnetic disk 10a) and the length L1$o$ of the convex parts 21so in the outer periphery are formed at an equal length. Accordingly, by carrying out the ion beam etching process until the upper surfaces of the respective convex parts 21si in the inner periphery of any of the ring-shaped regions Aa are exposed from the non-magnetic material 15, the upper surfaces of the respective convex parts 21si in the inner periphery of every ring-shaped region Aa and the upper surfaces of the respective convex parts 21so in the outer periphery of every ring-shaped region Aa are exposed from the non-magnetic material 15 (the upper surfaces of the convex parts 21si, 21so are exposed at substantially the same time in every ring-shaped region Aa, that is, across the entire range of the magnetic disk 10a). By doing so, the ion beam etching of the non-magnetic material 15 is completed and the surface of the preform 30 is made smooth. Next, after the protective layer 16 has been formed by forming a thin film of diamond-like carbon (DLC) by CVD so as to cover the surface of the preform 30, a fluoride lubricant is applied to the surface of the protective layer 16 so that the average thickness is around 2 nm, for example. By doing so, the magnetic disk 10a is completed as shown in FIG. 2.

On the magnetic disk 10a, as described above, since the non-magnetic material 15 (residue) on the respective convex parts 21s is removed across the entire region of the magnetic disk 10a (i.e., in every ring-shaped region Aa) as described above, the difference in height between the concaves and convexes on the surface of the magnetic disk 10a (in each ring-shaped region Aa, the difference in height Hi at the inner periphery and the difference in height Ho at the outer periphery) becomes substantially uniform across the entire region of the magnetic disk 10a (i.e., in every ring-shaped region Aa). More specifically, the degree of unevenness, that is, the surface roughness Ra of the surface of the magnetic disk 10a in the inner periphery region Aia of the ring-shaped region A1a for example is around 0.7 nm and the surface roughness Ra of the magnetic disk 10a in the outer periphery region Aoa of the ring-shaped region A1a is around 0.8 nm (in the other ring-shaped regions Aa also, the surface roughness Ra of the inner periphery region Aia and the surface roughness Ra of the outer periphery region Aoa are around 0.7 to 0.8 nm). Accordingly, the flying height of the magnetic head 3 (the slider) becomes substantially constant in every ring-shaped region Aa from the inner periphery of the magnetic disk 10a to the outer periphery, and therefore stabilized recording and reproducing are possible.

On the other hand, on the magnetic disk 10x manufactured according to the conventional method of manufacturing, the surface roughness Ra of the magnetic disk 10x in the inner periphery region Axi is around 0.7 nm in a state where the upper surface of the convex parts 21sxi are exposed from the non-magnetic material 15 in the inner periphery region Axi where the length L1xi along the direction of rotation is comparatively short. On the other hand, the surface roughness Ra of the magnetic disk 10x in the inner periphery region Axo where the length L1xo along the direction of rotation becomes longer than in the inner periphery region Axi in proportion to the distance from the center O of the concave/convex pattern 20t is around 3.1 nm due to the thickness of the residue on the convex parts 21sxo being thicker. In this case, when the non-magnetic material 15 is etched with etching conditions that expose the upper surfaces of the convex parts 21sxo from the non-magnetic material 15 in the outer periphery region Axo the etching of the non-magnetic material 15 proceeds inside the concave parts 22sx across the entire range from the inner periphery of the magnetic disk 10x to the outer periphery, thereby causing deterioration in the smoothness of the magnetic disk 10x. In addition, when the non-magnetic material 15 is etched with the etching conditions described above, the convex parts 21sxi in the inner periphery region Axi are excessively etched, resulting in the risk of it being difficult to read a magnetic signal properly. For this reason, on the magnetic disk 10x manufactured according to the conventional method of manufacturing, it is difficult to make it possible to read the servo data Ds properly while making the flying height of the magnetic head 3 (slider) uniform across the entire region from the inner periphery of the magnetic disk 10x to the outer periphery.

In this way, according to the magnetic disk 10a and the hard disk drive 1, by forming the concave/convex pattern 20sa that constructs the servo pattern by setting the unit convex part length in each ring-shaped region Aa so that a value produced by dividing the average length of the unit convex part length in a ring-shaped region Aa by the distance from the center O to the ring-shaped region Aa decreases from the ring-shaped regions Aa in the inner periphery to the ring-shaped regions Aa in the outer periphery, compared to the conventional magnetic disk 10x where the concave/convex pattern is formed so that the unit convex part length gradually increases from the inner periphery to the outer periphery of the magnetic disk 10x, the unit convex part length in the ring-shaped regions Aa in the outer periphery can be sufficiently reduced. Accordingly, when a layer of the non-magnetic material 15 formed so as to cover the respective convex parts 21 is etched, it is possible to avoid the situation where there is a large difference between the thickness of the residue on the convex parts 21s in the ring-shaped regions Aa in the outer periphery and the thickness of the residue on the convex parts 21s in the ring-shaped regions Aa in the inner periphery. In addition, when the non-magnetic material 15 is etched so that the non-magnetic material 15 (residue) is not left on the respective convex parts 21s in the entire range from the ring-shaped regions Aa in the inner periphery to the ring-shaped regions Aa in the outer periphery, it is possible to remove the residue on the respective convex parts 21s without the risk of a situation where in the ring-shaped regions Aa in the inner periphery, the convex parts 21s (magnetic material) themselves are etched together with the non-magnetic material 15. By doing so, it is possible to maintain favorable smoothness for the magnetic disk 10a across the entire range. Since it is possible to keep the flying height of the magnetic head 3 above the magnetic disk 10a substantially equal across the entire range of the magnetic disk 10a, the hard disk drive 1 can carry out recording and reproducing stably.

In addition, according to the magnetic disk 10a and the hard disk drive 1, by forming the concave/convex pattern 20sa (servo pattern) by setting the unit convex part length and the unit concave part length so that the ratio of the unit convex part length to the unit concave part length decreases within each ring-shaped region Aa from the inner periphery thereof to the outer periphery thereof, it is possible to sufficiently reduce the unit convex part length in the outer periphery of each ring-shaped region Aa. By doing so, it is possible to maintain favorable smoothness for the magnetic disk 10a across the entire range from the inner periphery to the outer periphery within each ring-shaped region Aa. Since it is possible to keep the flying height of the magnetic head 3 above the magnetic disk 10a substantially equal across the entire range from the inner periphery to the outer periphery within each ring-shaped region Aa, recording and reproducing can be carried out stably.

In addition, according to the magnetic disk 10a and the hard disk drive 1, by forming the concave/convex pattern 20sa (servo pattern) with the unit concave part length set so as to increase from the inner periphery to the outer periphery in each ring-shaped region Aa, unlike for example a structure where the unit concave part length is the same length across the entire range from the inner periphery to the outer periphery in each ring-shaped region Aa and the ratio of the unit convex part length to the unit concave part length decreases from the inner periphery to the outer periphery in each ring-shaped region Aa by changing the unit convex part length, it is possible to avoid a situation where the unit convex part length in the outer periphery of each ring-shaped region Aa is excessively short. Accordingly, it is possible to reliably avoid the occurrence of read errors for a magnetic signal read from the convex parts in the outer periphery of each ring-shaped region Aa.

In addition, according to the magnetic disk 10a and the hard disk drive 1, by forming the concave/convex pattern 20sa (the servo pattern) by setting the unit convex part length at an equal length across the entire range from the inner periphery to the outer periphery in each ring-shaped region Aa, it is possible to keep the thickness of the residue (the non-magnetic material 15) formed on the convex parts 21s in each ring-shaped region Aa uniform across an entire range from the inner periphery to the outer periphery of each ring-shaped region Aa. Also, when the non-magnetic material 15 is etched so as to not leave residue on the respective convex parts 21si in the inner periphery of each ring-shaped region Aa, it is possible to avoid the situation where the convex parts 21so (the magnetic material) themselves in the outer periphery of each ring-shaped region Aa are etched and the situation where residue is left on the convex parts 21so in the outer periphery, and when the non-magnetic material 15 is etched so as to not leave residue on the respective convex parts 21so in the outer periphery of each ring-shaped region Aa, it is possible to avoid the situation where the convex parts 21si (the magnetic material) themselves in the inner periphery of each ring-shaped region Aa are etched and the situation where residue is left on the convex parts 21si in the inner periphery.

In addition, according to the magnetic disk 10a and the hard disk drive 1, by forming the concave/convex pattern 20sa (servo pattern) so that the combined length of the unit convex part length and the unit concave part length (that is, the formation pitch of the convex parts and the concave parts) is set so as to increase in each ring-shaped region Aa from the inner periphery thereof to the outer periphery thereof in proportion to the distance from the center O of the concave/convex pattern 20t, it is possible to reliably read (detect) servo data Ds from the servo pattern Asa from the inner periphery to the outer periphery in each ring-shaped region Aa while rotating the magnetic disk 10a at a constant angular velocity and without changing, within the same ring-shaped region Aa, the frequency information (read frequency information) used as a reference for a clock used when reading the servo data Ds from the servo pattern region Asa.

Also, according to the magnetic disk 10a and the hard disk drive 1, by forming the concave/convex pattern 20sa that constructs the servo pattern with the average length of the unit convex part length in each ring-shaped region Aa set at an equal or substantially equal length in every ring-shaped region Aa from the ring-shaped region A1a in the inner periphery to the ring-shaped region A4a in the outer periphery, it is possible to maintain favorable smoothness across every ring-shaped region Aa from the ring-shaped region A1a in the inner periphery to the ring-shaped region A4a (that is, across the entire range from the inner periphery to the outer periphery of the magnetic disk 10a) without producing fluctuations in the smoothness in each ring-shaped region Aa. As a result, the flying height of the magnetic head 3 above the magnetic disk 10a is kept uniform across the entire range of the magnetic disk 10a.

In addition, according to the hard disk drive 1 equipped with the magnetic disk 10a, by having the control unit 8 control the servo data detecting unit 6 to read the servo data Ds corresponding to the servo pattern from the magnetic disk 10a based on the read frequency information set in advance for each ring-shaped region Aa, when carrying a seek operation for the magnetic head 3 from the ring-shaped region A1a in the inner periphery of the magnetic disk 10a to the ring-shaped region A4a in the outer periphery, for example, the number of frequency switching processes for the read frequency information can be suppressed to only three. Since seek operations can be carried out in a short time, data can be accessed at high speed. Also, since it is sufficient to output a number of types of frequency information corresponding to the number (in this example, four) of ring-shaped regions as the read frequency information, a tracking servo can be carried out by a control unit (the detection clock output unit 5 and the control unit 8) with a simple construction.

Next, another method of manufacturing the magnetic disk 10a will be described with reference to the drawings. It should be noted that detailed description of processes that are the same as in the method of manufacturing described above has been omitted.

Figure 15:
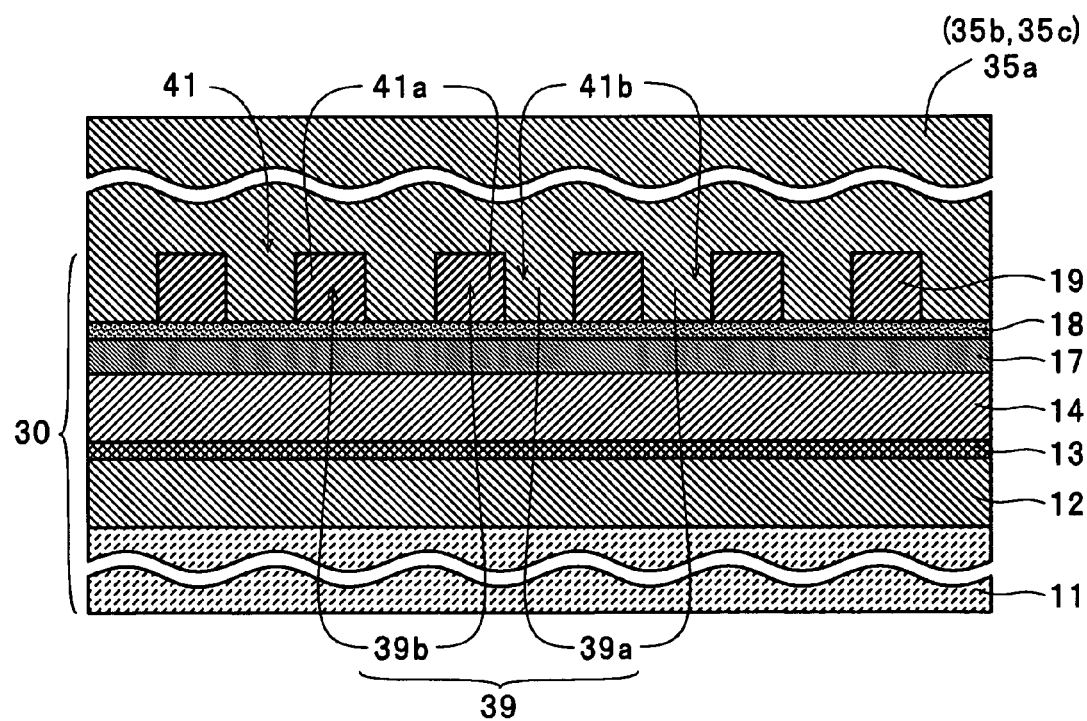
FIG. 15 is a cross-sectional view of the preform and the stamper in a state where the concave/convex pattern of the stamper has been pressed into the resin layer (the convex parts have been pressed into the resin layer)

Although in the method of manufacturing the magnetic disk 10a described above, a developing process is carried out after an exposure pattern has been drawn on the resin layer 19 of the preform 30 using an electron beam lithography apparatus to form the concave/convex pattern 41 (resist pattern) used as a mask for etching, the method of manufacturing an information recording medium according to the present invention is not limited to this. For example, it is possible to form the concave/convex pattern 41 in the resin layer 19 of the preform 30 by an imprinting method using a stamper 35a (see FIG. 15) as one example of a stamper according to the present invention. In this case, as shown in FIG. 15, a concave/convex pattern 39 where the positional relationship of the convexes and concaves is the reverse of the concave/convex pattern 20 (the concave/convex patterns 20t, 20sa) of the magnetic disk 10a is formed in the stamper 35a. It should be noted that the concave/convex pattern 39 of the stamper 35a is formed so that convex parts 39a correspond to the concave parts 22 in the concave/convex pattern 20 of the magnetic disk 10a and concave parts 39b correspond to the convex parts 21 of the concave/convex pattern 20. Accordingly, on the stamper 35a, the length of the convex parts 39a along the direction of rotation is substantially equal to the length along the direction of rotation of the concave parts 22 in the concave/convex pattern 20, and the length of the concave parts 39b along the direction of rotation is substantially equal to the length along the direction of rotation of the convex parts 21 in the concave/convex pattern 20. It should be noted that there are no particular limitations regarding the method of manufacturing the stamper 35a, and the stamper 35a can be manufactured according to a variety of known methods.

When the magnetic disk 10 is manufactured using the stamper 35a, as shown in FIG. 15, first the concave/convex pattern 39 of the stamper 35a is transferred to the resin layer 19 of the preform 30 by imprinting. More specifically, by pressing the surface of the stamper 35a in which the concave/convex pattern 39 is formed into the resin layer 19 of the preform 30, the convex parts 39a of the concave/convex pattern 39 are pressed into the resin layer 19 of the preform 30. Next, the stamper 35a is separated from the preform 30 and resin (residue: not shown) remaining in the bottom surfaces are removed by an oxygen plasma process. By doing so, as shown in FIG. 11, the concave/convex pattern 41 is formed on the Si mask layer 18 of the preform 30. Next, by etching the Si mask layer 18 using the concave/convex pattern 41 as a mask, the concave/convex pattern 42 is formed on the C mask layer 17, and by etching the C mask layer 17 using the concave/convex pattern 42 as a mask, the concave/convex pattern 43 is formed on the magnetic layer 14. After this, the magnetic layer 14 is etched using the concave/convex pattern 43 as a mask to form the concave/convex pattern 20 on the intermediate layer 13. Next, after the non-magnetic material 15 has been sputtered in the same way as the method of manufacturing described above, ion beam etching is carried out on the layer of the non-magnetic material 15 to make the surface smooth. After this, the protective layer 16 is formed by forming a thin film of diamond-like carbon (DLC) using CVD and a fluoride lubricant is applied onto the surface of the protective layer 16. By doing so, as shown in FIG. 2, the magnetic disk 10a is completed.

In this way, according to the stamper 35a for manufacturing the magnetic disk 10a, by forming the concave/convex pattern 39 with the convex parts 39a formed corresponding to the concave parts 22 in the concave/convex pattern 20 (the concave/convex patterns 20t, 20sa) of the magnetic disk 10a and the concave parts 39b formed corresponding to the convex parts 21 in the concave/convex pattern 20 of the magnetic disk 10a, unlike for example a method of manufacturing that forms the concave/convex pattern 41 by using an electron beam lithography apparatus to draw an exposure pattern with the same planar shape as the concave/convex patterns 20sa, 20t in the resin layer 19 of the preform 30 and then developing the exposure pattern, it is possible to easily form the concave/convex pattern 41 in a short time by merely pressing the concave/convex pattern 39 of the stamper 35a into the resin layer 19. It is also possible to form the concave/convex pattern 41 in a large number of preforms 30 using a single stamper 35a. Accordingly, the manufacturing cost of the magnetic disk 10a can be sufficiently reduced.

Next, the magnetic disk 10b that is another example of an information recording medium according to the present invention and a hard disk drive 1b equipped with the magnetic disk 10b (another example of a recording/reproducing apparatus according to the present invention) will be described with reference to the drawings. It should be noted that component elements that are the same as in the magnetic disk 10a and the hard disk drive 1 have been assigned the same reference numerals and description thereof is omitted.

Figure 16:
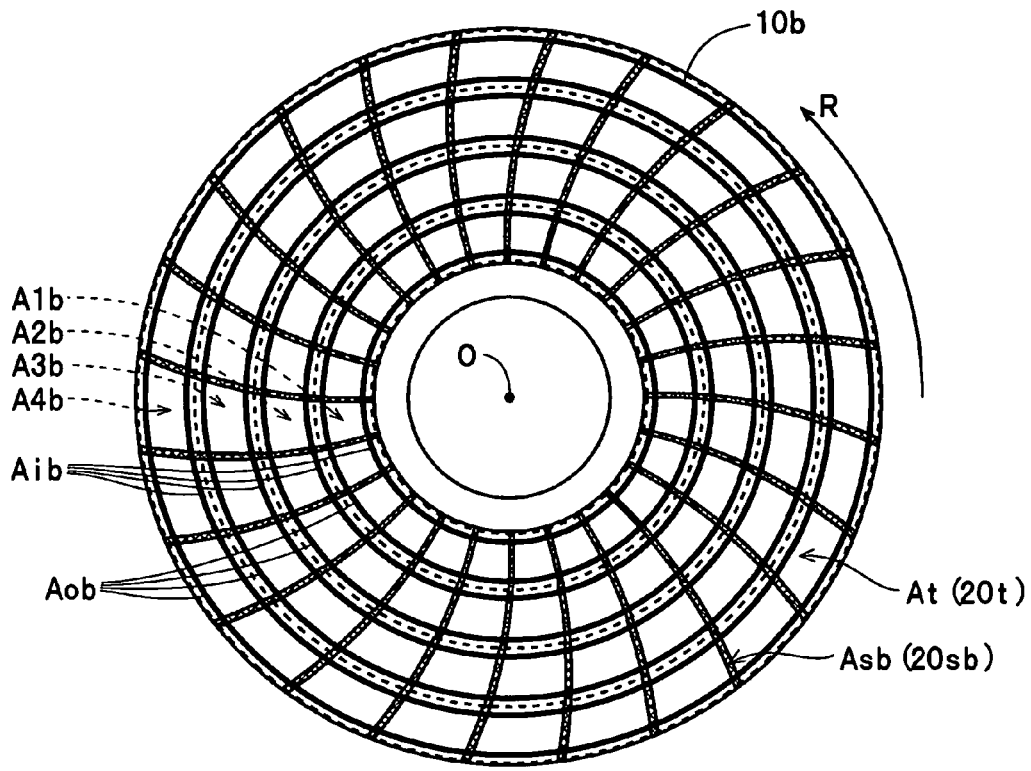
FIG. 16 is a plan view of another magnetic disk.

On the magnetic disk 10b shown in FIG. 16, a concave/convex pattern 20 is formed with the inner periphery to the outer periphery of the magnetic disk 10b being partitioned into four concentric ring-shaped regions A1b to A4b (one example of a "plurality of ring-shaped regions" for the present invention: hereinafter referred to as the "ring-shaped regions Ab" when no distinction is required) whose center is the center O of the concave/convex pattern 20t, or in other words, the ring-shaped regions A1b to A4b are concentric with the concave/convex pattern 20t. Also, on the magnetic disk 10b, in place of the servo pattern regions Asa of the magnetic disk 10a, servo pattern regions Asb are provided between the track pattern regions At, with the track pattern regions At and the servo pattern regions Asb being alternately disposed in the direction of rotation (the direction of the arrow R) of the magnetic disk 10b.

Figure 17:
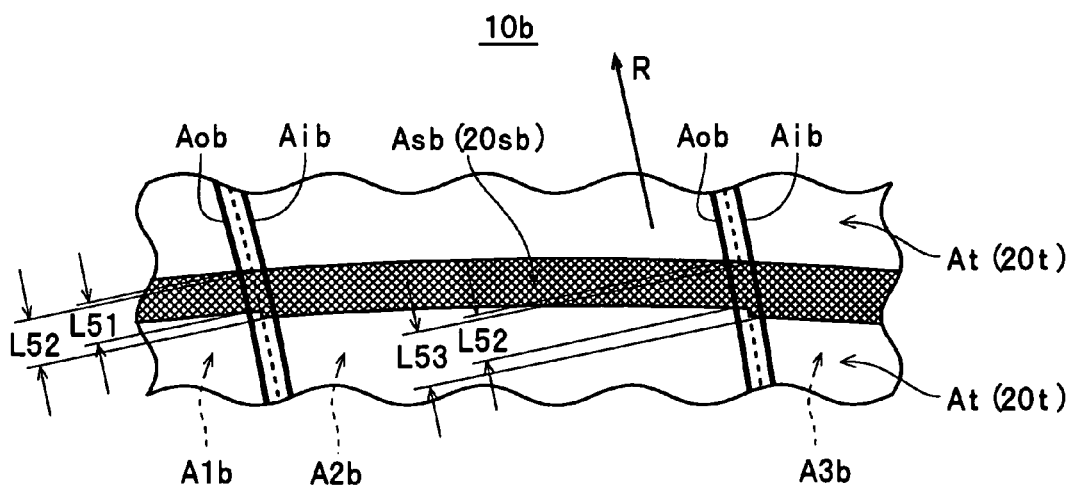
FIG. 17 is a plan view of another servo pattern region on the another magnetic disk.
Figure 21:
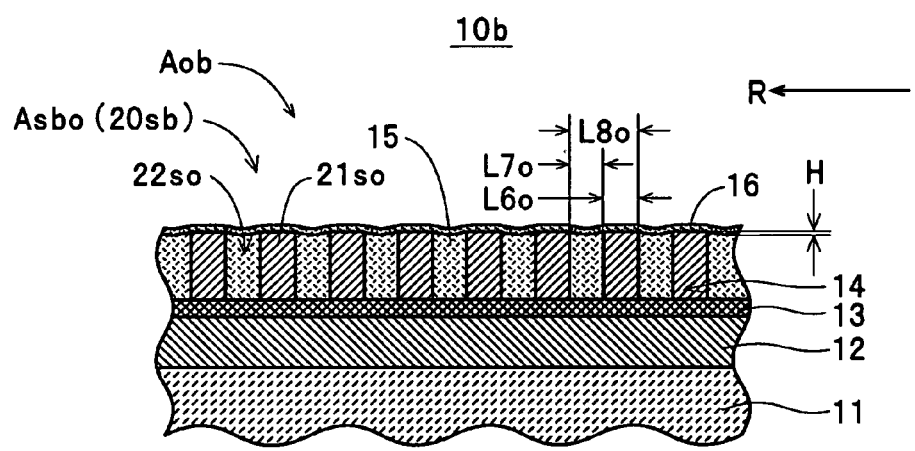
FIG. 21 is a cross-sectional view of another outer periphery servo pattern region in the another outer periphery region.

Also, as shown in FIGS. 17 and 21, a concave/convex pattern 20sb is formed as a servo pattern in place of the concave/convex pattern 20sa of the magnetic disk 10a in the servo pattern regions Asb (an inner periphery servo pattern region Asbi in an inner periphery of each ring-shaped region Ab and an outer periphery servo pattern region Asbo in an outer periphery of each ring-shaped region Ab). Here, in the same way as the concave/convex pattern 20sa, the concave/convex pattern 20sb is composed of convex parts 21s (convex parts 21si and convex parts 21so) that construct various types of servo patterns such as a preamble pattern, an address pattern, and a burst pattern, and concave parts 22s (concave parts 22si and concave parts 22so). In addition, on the magnetic disk 10b, the respective convex parts 21s are formed so that the lengths of the convex parts 21s along the direction of rotation (the direction of the arrow R in the respective drawings) are equal across the entire range from the inner periphery to the outer periphery in each ring-shaped region Ab without being proportional to the distance from the center O of the concave/convex pattern 20t (i.e., without becoming longer toward the outer periphery). This is one example of where a value produced by dividing the unit convex part length by the distance from the center of the data track pattern is set so as to decrease within each ring-shaped region from the inner periphery of the ring-shaped region to the outer periphery of the ring-shaped region as one example of where the "unit convex part length is equal or substantially equal" for the present invention.

In the same way, the respective concave parts 22s are formed so that the length of the concave parts 22s along the direction of rotation is equal across the entire range from the inner periphery to the outer periphery in each ring-shaped region Ab without being proportional to the distance from the center O of the concave/convex pattern 20t (i.e., without becoming longer toward the outer periphery). This is one example of where the concave parts 22s are formed so that a value produced by dividing the unit concave part length by the distance from the center of the data track pattern decreases within each ring-shaped region from the inner periphery of the ring-shaped region to the outer periphery of the ring-shaped region, which is one example of where the "unit concave part length is equal or substantially equal" for the present invention. For this reason, on the magnetic disk 10b, the combined length of the length of the convex parts 21s and the length of the concave parts 22s along the direction of rotation (that is, the formation pitch of the convex parts 21s and the concave parts 22s) is set so as to be equal across the entire range from the inner periphery to the outer periphery in each ring-shaped region Ab without being proportional to the distance from the center O of the concave/convex pattern 20t (i.e., without becoming longer toward the outer periphery). Accordingly, as shown in FIG. 17, in the ring-shaped region A2b, for example, the length L52 along the direction of rotation in the inner periphery of the ring-shaped region A2b and the length L52 along the direction of rotation in the outer periphery of the ring-shaped region A2b are equal. In this case, on the magnetic disk 10b, as one example the respective lengths L51 to L54 along the direction of rotation in the ring-shaped regions A1b to A4b are set so as to gradually increase toward the ring-shaped regions Ab in the outer periphery. Also, as shown in FIGS. 19 and 21, the concave/convex pattern 20sb is formed so that the ratio of the length of the convex parts 21s to the length of the concave parts 22s along the direction of rotation is equal across the entire range from the inner periphery to the outer periphery in each ring-shaped region Ab.

Figure 18:
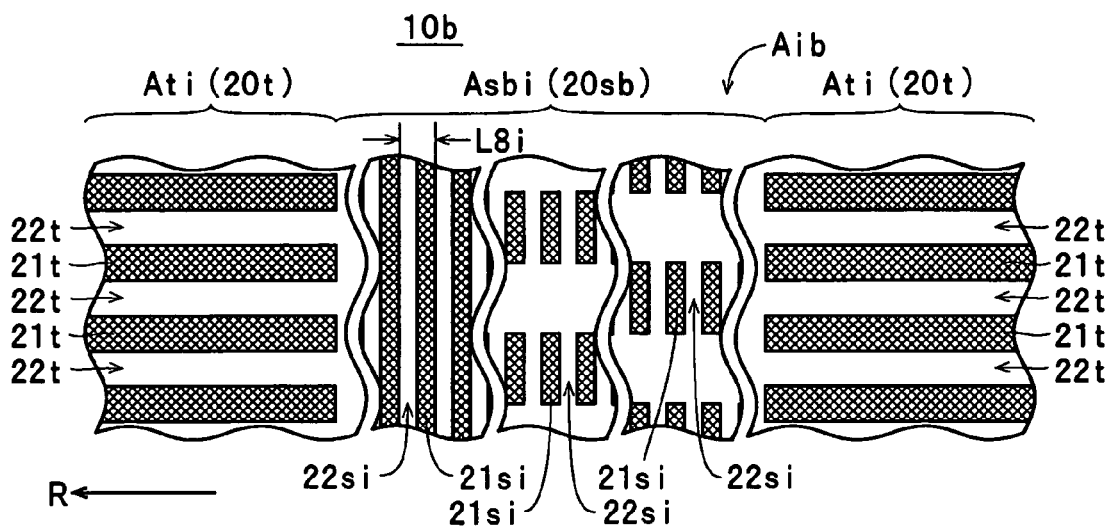
FIG. 18 is a plan view of another inner periphery region in another ring-shaped region.
Figure 19:
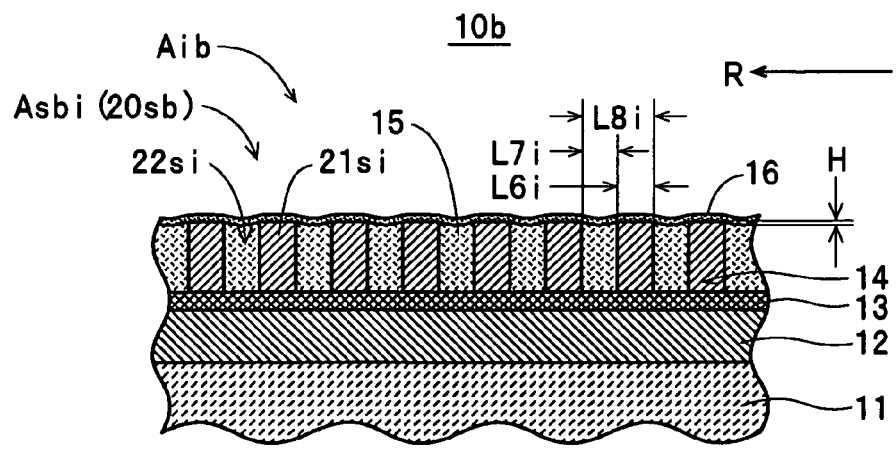
FIG. 19 is a cross-sectional view of another inner periphery servo pattern region in the another inner periphery region.
Figure 20:
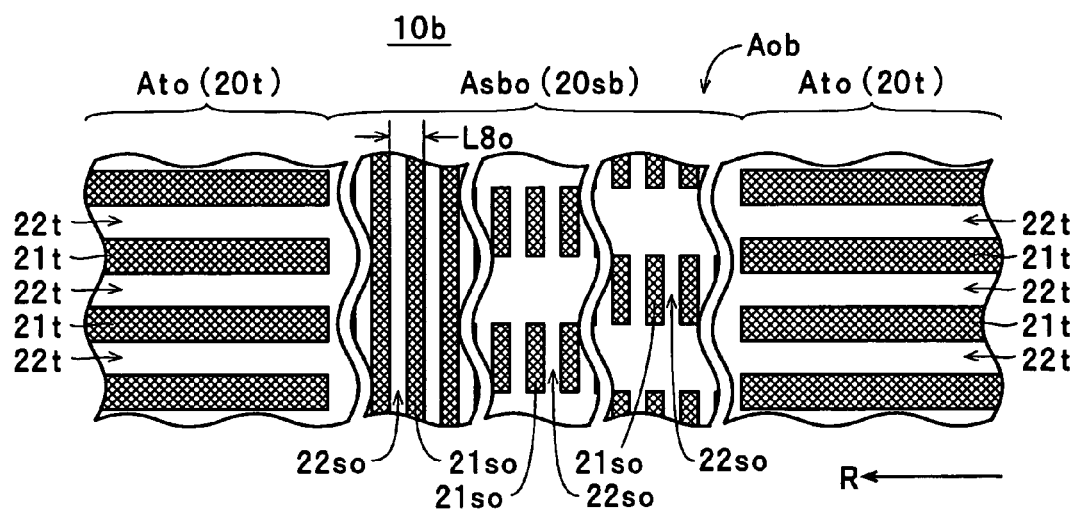
FIG. 20 is a plan view of another outer periphery region in the another ring-shaped region.

More specifically, as shown in FIGS. 18 and 19, in an inner periphery region Aib (as one example, a preamble pattern formation region in the ring-shaped region A1b at a position 11 mm from the center O) in each ring-shaped region Ab, a length L8i that is the combined length of a length L7i of a concave part 22si (as one example, 220 nm) and a length L6i of a convex part 21si (as one example, 220 nm) is set at 440 nm. Also, as shown in FIGS. 20 and 21, in an outer periphery region Aob (as one example, a preamble pattern formation region in the ring-shaped region A1b at a position 16 mm from the center O) in each ring-shaped region Ab, a length L8o that is the combined length of a length L7o of a concave part 22so (as one example, 220 nm which is equal to the length L7i of the convex parts 21si) and a length L6o of a convex part 21so (as one example, 220 nm which is equal to the length L6i of the convex parts 21si) is set at 440 nm. As a result, as shown in FIGS. 19 and 21, on the magnetic disk 10b, the ratio of the length L6i of the convex parts 21si to the length L7i of the concave parts 22si in the concave/convex pattern 20sb in the inner periphery region Aib inside each ring-shaped region Ab and the ratio of the length L6o of the convex parts 21so to the length L7o of the concave parts 22so in the outer periphery region Aob inside each ring-shaped region Ab are both 1. In this case, the ratio of the length (unit convex part length) of the convex parts 21s to the length (unit concave part length) of the concave parts 22s is set in the same way not only for the preamble pattern mentioned above but also for the concave/convex pattern 20sb that constructs the address pattern and the burst pattern. Regarding the burst pattern, in a region where a plurality of oblong convex parts 21s are disposed in lines on both sides on the concave parts 22s along the direction of rotation of the magnetic disk 10b, the ratio of the unit convex part length to the unit concave part length is set so that the above conditions are satisfied.

Also, on the magnetic disk 10b, the average length of the convex parts 21s inside each ring-shaped region Ab is set so as to become slightly longer from the ring-shaped region A1b in the inner periphery to the ring-shaped region A4b in the outer periphery. In addition, on the magnetic disk 10b, a value produced by dividing the average length of the convex parts 21s inside each ring-shaped region Ab by the distance from the center O of the concave/convex pattern 20t to the ring-shaped region Ab (as one example, an innermost position in the ring-shaped region Ab) decreases from the ring-shaped region A1b in the inner periphery to the ring-shaped region A4b in the outer periphery.

It should be noted that in FIGS. 18 to 21, the preamble pattern and burst pattern in the servo pattern are schematically illustrated and for ease of understanding, the lengths of the respective convex parts 21s and the respective concave parts 22s along the direction of rotation are illustrated using the unit convex part length and unit concave part length of the servo pattern only. Accordingly, on actual magnetic disks 10b, the number, formation positions, and lengths of the convex parts 21s and the concave parts 22s differ to the states shown in the respective drawings, and the concave/convex pattern 20sb is formed with the number, formation positions, and lengths of the convex parts 21s and the concave parts 22s corresponding to the various types of control data including information (patterns) such as track addresses and sector addresses required for tracking servo control. In this case, the actual lengths of the convex parts 21s and the concave parts 22s are integer multiples of the lengths of the convex parts 21s and the concave parts 22s (i.e., integer multiples of the unit convex part length and the unit concave part length). It should be noted that since the method of manufacturing the magnetic disk 10b is the same as the method of manufacturing the magnetic disk 10a described above, description thereof has been omitted. In this case, when the magnetic disk 10b is manufactured by imprinting, a stamper 35b (see FIG. 15) on which a concave/convex pattern 39 including concave parts 39b corresponding to the convex parts 21 in the concave/convex pattern 20 of the magnetic disk 10b and convex parts 39a corresponding to the concave parts 22 in the concave/convex pattern 20 of the magnetic disk 10b are formed may be used.

The magnetic disk 10b is formed so that the length L6i of the convex parts 21si in the inner periphery of each ring-shaped region Ab and the length L6o of the convex parts 21so in the outer periphery of each ring-shaped region Ab are the same length (for example, 220 nm in the ring-shaped region A1b). Accordingly, when the non-magnetic material 15 is subjected to ion-beam etching during the manufacturing of the magnetic disk 10b, by carrying out the ion-beam etching until the upper surfaces of the respective convex parts 21si in the inner periphery of each ring-shaped region Ab are exposed from the non-magnetic material 15, the upper surfaces of the respective convex parts 21so in the outer periphery of each ring-shaped region Ab also become exposed from the non-magnetic material 15 (the upper surfaces of the convex parts 21si, 21so become exposed at substantially the same time). Accordingly, as shown in FIGS. 19 and 21, the non-magnetic material 15 (residue) on the respective convex parts 21s is removed across the entire region inside each ring-shaped region Ab on the magnetic disk 10b. For this reason, the difference in height H between the concaves and convexes on the surface of the magnetic disk 10b becomes uniform across the entire region inside each ring-shaped region Ab. More specifically, the degree of unevenness, that is, the surface roughness Ra of the surface of the magnetic disk 10b, for example, in both the inner periphery region Ai and the outer periphery region Ao of the ring-shaped region A1b for example is around 0.7 nm (the surface roughness Ra is substantially the same in the other ring-shaped regions Ab also). Accordingly, the flying height of the magnetic head 3 (the slider) becomes substantially constant across the entire range from the inner periphery to the outer periphery of the magnetic disk 10b, so that stabilized recording and reproducing become possible.

Also, on the magnetic disk 10b, as described above, the respective convex parts 21s and the respective concave parts 22s are formed so that in each ring-shaped region Ab, the combined length (lengths L8i, L8o) of the length of the convex parts 21s and the length of the concave parts 22s along the direction of rotation in the concave/convex pattern 20sb of the servo pattern region Asb is equal across the entire range from the inner periphery to the outer periphery of the ring-shaped region Ab. Accordingly, as shown in FIG. 17, as one example, the length L52 along the direction of rotation of the inner periphery servo pattern region Asbi (the inner periphery concave/convex pattern 20sb) in the ring-shaped region A2b and the length L52 along the direction of rotation of the outer periphery servo pattern region Asbo (the outer periphery concave/convex pattern 20sb) are equal. For this reason, on the magnetic disk 10b, the length along the direction of rotation of the track pattern region At gradually increases from the inner periphery to the outer periphery in each ring-shaped region Ab. More specifically, the length along the direction of rotation of the inner periphery track pattern region Ato (the outer periphery concave/convex pattern 20t) is longer than the length along the direction of rotation of the inner periphery track pattern region Ati (the inner periphery concave/convex pattern 20t). Accordingly, compared to the conventional magnetic disk 10x, the recording capacity for recording data is increased by an amount equivalent to the increase in the length of the convex parts 21t in the outer periphery of each ring-shaped region Ab.

In this case, on the magnetic disk 10b, the concave/convex pattern 20sb is formed so that the length of the servo pattern region Asb along the direction of rotation is equal across the entire range from the inner periphery to the outer periphery in each ring-shaped region Ab. For this reason, when the magnetic disk 10b is rotated at a fixed angular velocity, the time that the servo pattern region Asb passes below the magnetic head 3 decreases from the inner periphery of a ring-shaped region Ab to the outer periphery of the ring-shaped region Ab. Accordingly, in the hard disk drive 1b (see FIG. 1) equipped with the magnetic disk 10b, unlike the hard disk drive 1 equipped with the magnetic disk 10a described above, the ROM 9 stores clock data Dc1 for the read frequency information corresponding to the movement positions of the magnetic head 3 in each ring-shaped region Ab (distances from the center O to each ring-shaped region Ab). In addition, based on the clock data Dc1, in each ring-shaped region Ab for example, the control unit 8 linearly converts the frequency of the read frequency information so that the wavelength becomes shorter from the inner periphery of the ring-shaped region Ab to the outer periphery of the ring-shaped region Ab in proportion to the distance from the center O of the concave/convex pattern 20t, and outputs the read frequency information to the detection clock output unit 5. Accordingly, it is possible to reliably read the servo pattern (servo data) from the servo pattern Asb while the magnetic disk 10b is rotated at a fixed angular velocity.

In this way, according to the magnetic disk 10b and the hard disk drive 1b, by forming the concave/convex pattern 20sb that constructs the servo pattern by setting the unit convex part length in each ring-shaped region Ab so that a value produced by dividing the average length of the unit convex part length in each ring-shaped region Ab by a distance from the center O to the ring-shaped region Ab decreases from the ring-shaped regions Ab in the inner periphery to the ring-shaped regions Ab in the outer periphery, compared to the conventional magnetic disk 10x with a concave/convex pattern formed so that the unit convex part length gradually increases from the inner periphery to the outer periphery of the magnetic disk 10x, the unit convex part length of the ring-shaped regions Ab in the outer periphery can be sufficiently reduced. Accordingly, when the layer of the non-magnetic material 15 formed so as to cover the respective convex parts 21 is etched, it is possible to avoid a situation where there is a large difference between the thickness of the residue on the convex parts 21s in the ring-shaped regions Ab in the outer periphery and the thickness of the residue on the convex parts 21s in the ring-shaped regions Ab in the inner periphery. Also, when the non-magnetic material 15 is etched so that the non-magnetic material 15 (residue) is not left on the respective convex parts 21s across the entire range from the ring-shaped regions Ab in the inner periphery to the ring-shaped regions Ab in the outer periphery, it is possible to remove the residue on the respective convex parts 21s without causing a situation where the convex parts 21s (magnetic material) themselves are etched together with the non-magnetic material 15 in the ring-shaped regions Ab in the inner periphery. Accordingly, it is possible to maintain favorable smoothness for the magnetic disk 10b across the entire range of the magnetic disk 10b. Since the flying height of the magnetic head 3 above the magnetic disk 10b can be kept substantially equal across the entire range of the magnetic disk 10b, stabilized recording and reproducing can be carried out by the hard disk drive 1b.

Also, according to the magnetic disk 10b and the hard disk drive 1b, by forming the concave/convex pattern 20sb (servo pattern) by setting the unit convex part length so that a value produced by dividing the unit convex part length by the distance from the center O of the concave/convex pattern 20t decreases in each ring-shaped region Ab from the inner periphery thereof to the outer periphery thereof, compared to the conventional magnetic disk 10x with the concave/convex pattern formed so that the unit convex part length along the direction of rotation increases in proportion to the distance from the center O (so that a value produced by dividing the unit convex part length by the distance from the center O is equal across the entire range from the inner periphery to the outer periphery of each ring-shaped region Ab), it is possible to sufficiently reduce the unit convex part length in the outer periphery of each ring-shaped region Ab. Accordingly, when the layer of the non-magnetic material 15 formed so as to cover the respective convex parts 21 is etched, it is possible to avoid a situation where there is a large difference between the thickness of the residue on the convex parts 21so in the outer periphery of the ring-shaped region Ab and the thickness of the residue on the convex parts 21si in the inner periphery. Also, when the non-magnetic material 15 is etched so that the non-magnetic material 15 (residue) is not left on the respective convex parts 21s across the entire range from the inner periphery to the outer periphery in each ring-shaped region Ab, it is possible to remove the residue on the respective convex parts 21s without causing a situation where the convex parts 21s (magnetic material) themselves are etched together with the non-magnetic material 15 in the inner periphery of each ring-shaped regions Ab. Accordingly, it is possible to maintain favorable smoothness for the magnetic disk 10b across the entire range from the inner periphery to the outer periphery in each ring-shaped region Ab. Since the flying height of the magnetic head 3 above the magnetic disk 10b can be kept substantially equal across the entire range from the inner periphery to the outer periphery in each ring-shaped region Ab, stabilized recording and reproducing can be carried out by the hard disk drive 1b.

In addition, according to the magnetic disk 10b and the hard disk drive 1b, by forming the concave/convex pattern 20sb (servo pattern) by setting the unit concave part length so that a value produced by dividing the unit concave part length by the distance from the center O of the concave/convex pattern 20t decreases in each ring-shaped region Ab from the inner periphery thereof to the outer periphery thereof, compared to the conventional magnetic disk 10x with the concave/convex pattern formed so that the unit concave part length along the direction of rotation increases in proportion to the distance from the center O (so that a value produced by dividing the unit concave part length by the distance from the center O is equal across the entire range from the inner periphery to the outer periphery), it is possible to sufficiently reduce the unit concave part length in the outer periphery of each ring-shaped region. In this case, the present inventors have discovered a phenomenon whereby at positions where concave parts with an excessively long length along the direction of rotation are present, the etching of the non-magnetic material on convex parts formed on both sides of the concave parts proceeds slowly. On the other hand, according to the magnetic disk 10b, since the unit concave part length of the respective concave parts 22s is sufficiently short as described above, it is possible to etch the layer of the non-magnetic material 15 without causing the situation where the etching of the non-magnetic material 15 on the convex parts 21s proceeds slowly, and as a result, it is possible to avoid the situation where there is a large difference between the thickness of the residue on the convex parts 21so in the outer periphery of each ring-shaped region and the thickness of the residue on the convex parts 21si in the inner periphery. Also, when the non-magnetic material 15 is etched so that the non-magnetic material 15 (residue) is not left on the respective convex parts 21s across the entire range from the inner periphery to the outer periphery in each ring-shaped region, the residue on the respective convex parts 21s can be removed without causing a situation where the convex parts 21s (magnetic material) themselves are etched together with the non-magnetic material 15 in the inner periphery of each ring-shaped region. By doing so, it is possible to make the magnetic disk 10b even smoother across the entire range from the inner periphery to the outer periphery in each ring-shaped region Ab.

In addition, according to the magnetic disk 10b and the hard disk drive 1b, by forming the concave/convex pattern 20sb (the servo pattern) by setting the unit convex part length at an equal length across the entire range from the inner periphery to the outer periphery in each ring-shaped region Ab, it is possible to keep the etching conditions (the etching rate) for the non-magnetic material 15 on the respective convex parts 21s (the magnetic material) uniform across an entire range from the inner periphery to the outer periphery in each ring-shaped region. Accordingly, the difference between the thickness of the residue on the convex parts 21so in the outer periphery and the thickness of the residue on the convex parts 21si in the inner periphery in each ring-shaped region can be sufficiently reduced. Also, when the non-magnetic material 15 is etched so as to not leave the non-magnetic material 15 (residue) on the respective convex parts 21s across the entire range from the inner periphery to the outer periphery in each ring-shaped region, it is possible to remove the residue on the respective convex parts 21s while avoiding the situation where in the inner periphery of each ring-shaped region, the convex parts 21s (the magnetic material) themselves are etched together with the non-magnetic material 15. Accordingly, it is possible to further improve the smoothness of the magnetic disk 10b and make the smoothness even more uniform across the entire range from the inner periphery to the outer periphery in each ring-shaped region Ab. As a result, the flying height of the magnetic head 3 above the magnetic disk 10b can be kept uniform across the entire range from the inner periphery to the outer periphery in each ring-shaped region Ab on the magnetic disk 10b.

In addition, according to the magnetic disk 10b and the hard disk drive 1b, by forming the concave/convex pattern 20sb (the servo pattern) by setting the unit concave part length at an equal length across the entire range from the inner periphery to the outer periphery in each ring-shaped region Ab, it is possible to keep the etching conditions (the etching rate) for the non-magnetic material 15 on the respective convex parts 21s (the magnetic material) uniform across an entire range from the inner periphery to the outer periphery in each ring-shaped region. Accordingly, the difference between the thickness of the residue on the convex parts 21so in the outer periphery and the thickness of the residue on the convex parts 21*si* in the inner periphery in each ring-shaped region can be sufficiently reduced. Also, when the non-magnetic material 15 is etched so as to not leave the non-magnetic material 15 (residue) on the respective convex parts 21*s* across the entire range from the inner periphery to the outer periphery in each ring-shaped region, it is possible to remove the residue on the respective convex parts 21*s* while avoiding the situation where in the inner periphery of each ring-shaped region, the convex parts 21*s* (the magnetic material) themselves are etched together with the non-magnetic material 15. Accordingly, it is possible to further improve the smoothness of the magnetic disk 10*b* and make the smoothness even more uniform across the entire range from the inner periphery to the outer periphery.

In addition, according to the magnetic disk 10*b* and the hard disk drive 1*b*, by reading the servo data corresponding to the servo pattern from the magnetic disk 10*b* by having the control unit 8 control the servo data detecting unit 6 based on the read frequency information set in advance in accordance with the distance from the center O of the concave/convex pattern 20*t*, it is possible to reliably read the servo pattern (servo data) while the magnetic disk 10*b* is rotated at a fixed angular velocity.

Next, the magnetic disk 10*c* that is yet another example of an information recording medium according to the present invention will be described with reference to the drawings. It should be noted that component elements that are the same as in the magnetic disks 10*a*, 10*b* and component elements in the hard disk drive 1 aside from the magnetic disk 10*a* have been assigned the same reference numerals and description thereof is omitted.

Figure 22:
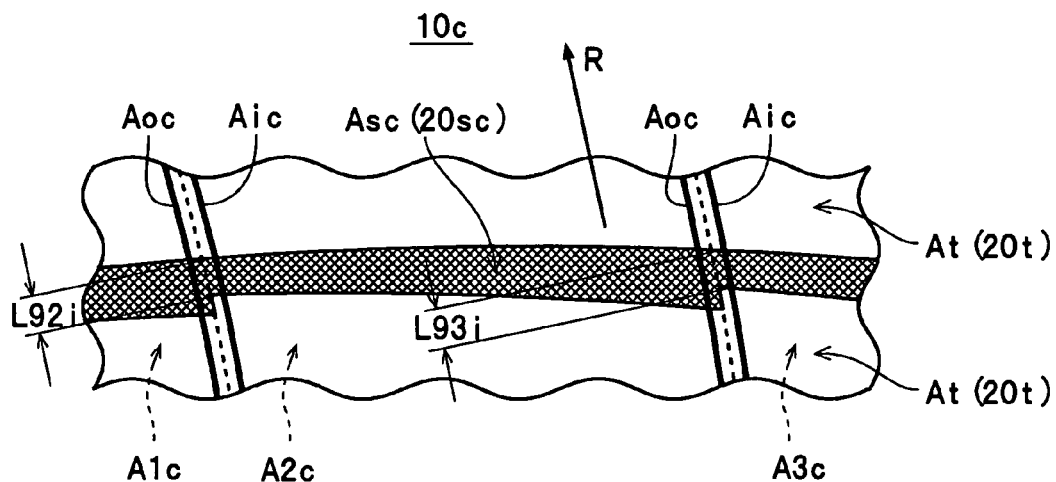
FIG. 22 is a plan view of still another servo pattern region on still another magnetic disk.

On the magnetic disk 10*c* shown in FIG. 22, in the same way as the magnetic disks 10*a*, 10*b* described above, the concave/convex pattern 20 (concave/convex patterns 20*t*, 20*sc*) is formed with the inner periphery to the outer periphery of the magnetic disk 10*c* being partitioned into four concentric ring-shaped regions A1*c* to A4*c* (one example of a "plurality of ring-shaped regions" for the present invention: hereinafter referred to as the "ring-shaped regions Ac" when no distinction is required) whose center is the center O of the concave/convex pattern 20*t*, or in other words, the ring-shaped regions A1*c* to A4*c* are concentric with the concave/convex pattern 20*t*. It should be noted that in FIG. 22, only three ring-shaped regions A1*c* to A3*c* centered on the ring-shaped region A2*c* are illustrated. Also, on the magnetic disk 10*c*, in place of the servo pattern regions Asa of the magnetic disk 10*a*, servo pattern regions Asc are provided between the track pattern regions At, with the track pattern regions At and the servo pattern regions Asc being alternately disposed in the direction of rotation (the direction of the arrow R) of the magnetic disk 10*c*.

Also, as shown in FIGS. 22 to 26, the concave/convex pattern 20*sc* is formed in the servo pattern region Asc (the inner periphery servo pattern region Asci in the inner periphery of each ring-shaped region Ac and the outer periphery servo pattern region Asco in the outer periphery of each ring-shaped region Ac) as the servo pattern in place of the concave/convex pattern 20*sa* of the magnetic disk 10*a*. In this case, in the same way as the concave/convex patterns 20*sa*, 20*sb*, the concave/convex pattern 20*sc* is constructed of the convex parts 21*s* (the convex parts 21*si* and the convex parts 21*so*) and the concave parts 22*s* (the concave parts 22*si* and the concave parts 22*so*), the convex parts 21*s* and the concave parts 22*s* are constructed of the various servo patterns such as the preamble pattern, the address pattern, and the burst pattern. Also, on the magnetic disk 10*c*, the respective convex parts 21*s* are formed by setting the length of the convex parts 21*s* along the direction of rotation (the direction of the arrow R in the respective drawings) so as to increase in each ring-shaped region Ac from the inner periphery to the outer periphery in proportion to the distance from the center O of the concave/convex pattern 20*t*. In the same way, the respective concave parts 22*s* are formed by setting the length of the concave parts 22*s* along the direction of rotation so as to increase in each ring-shaped region Ac from the inner periphery to the outer periphery in proportion to the distance from the center O of the concave/convex pattern 20*t*. For this reason, the magnetic disk 10*c* is formed so that the combined length of the length of the convex parts 21*s* and the length of the concave parts 22*s* along the direction of rotation (that is, the formation pitch of the convex parts 21*s* and the concave parts 22*s*) increases in each ring-shaped region Ac from the inner periphery thereof to the outer periphery thereof in proportion to the distance from the center O of the concave/convex pattern 20*t*.

Figure 23:
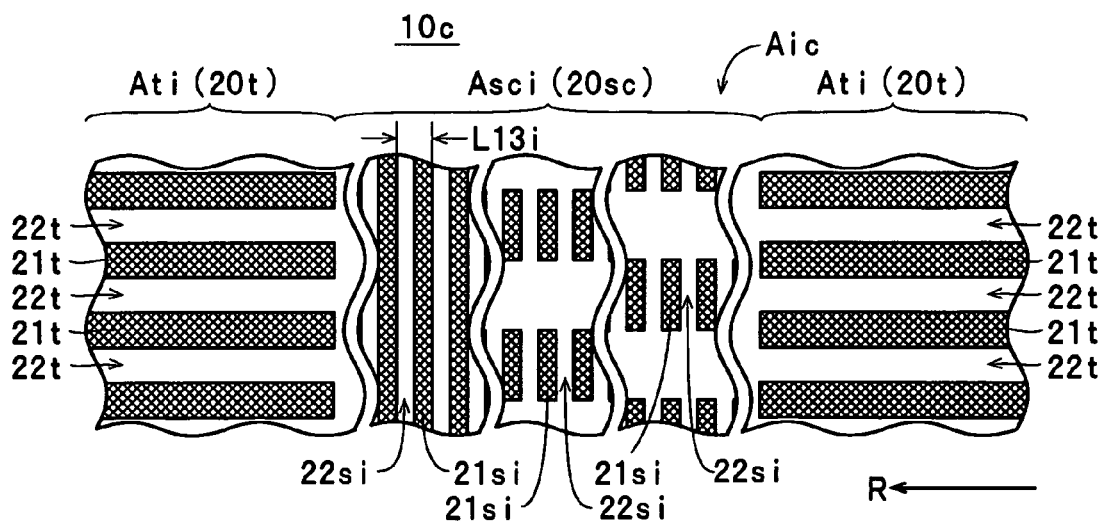
FIG. 23 is a plan view of still another inner periphery region in still another ring-shaped region.
Figure 24:
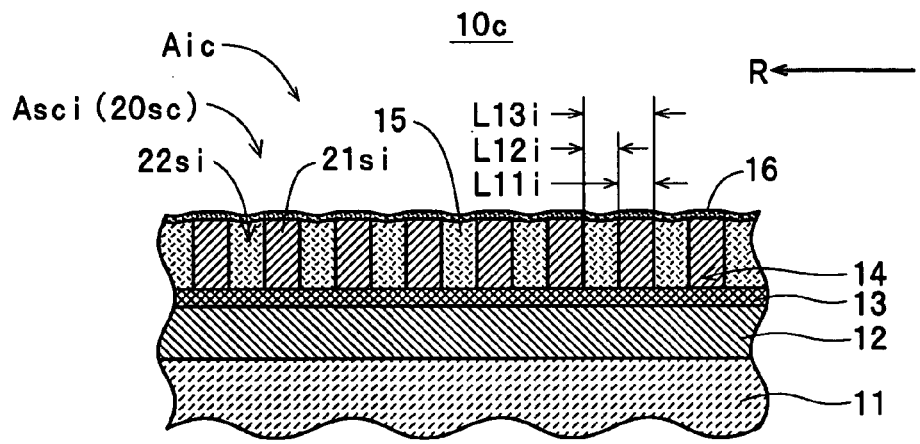
FIG. 24 is a cross-sectional view of still another inner periphery servo pattern region in the still another inner periphery region.
Figure 25:
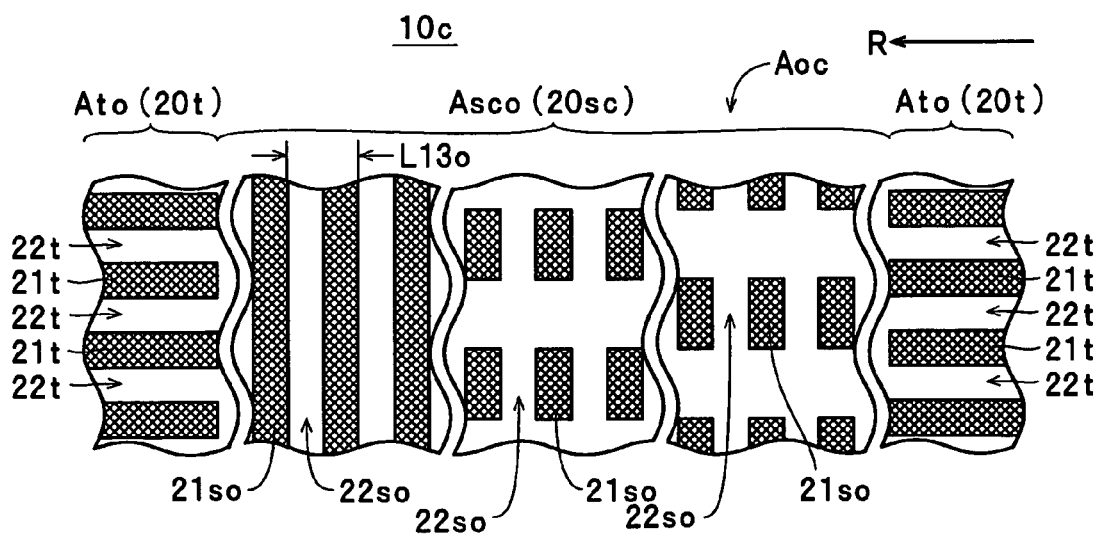
FIG. 25 is a plan view of still another outer periphery region in the still another ring-shaped region.
Figure 26:
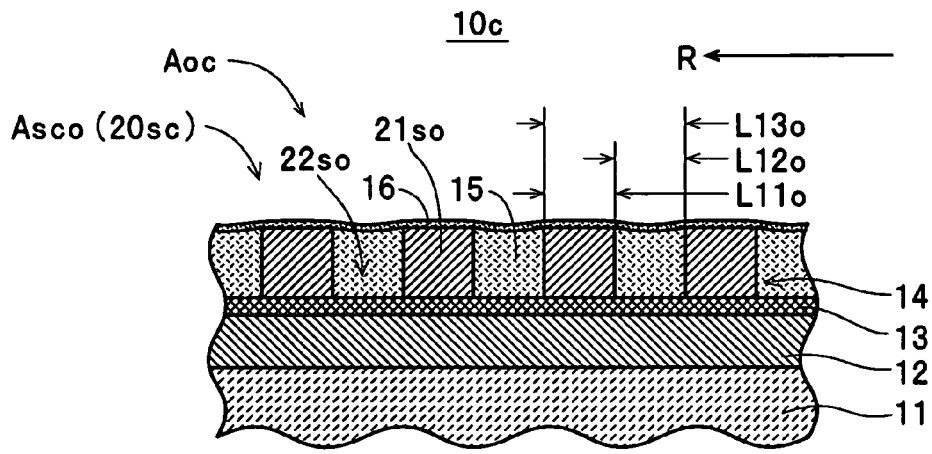
FIG. 26 is a cross-sectional view of still another outer periphery servo pattern region in the still another outer periphery region.

More specifically, as shown in FIGS. 23 and 24, in an inner periphery region Aic (as one example, a preamble pattern formation region in the ring-shaped region A1*c* at a position 11 mm from the center O) out of the ring-shaped regions Ac, a length L13*i* that is the combined length of a length L12*i* of a concave part 22*si* (as one example, 220 nm) and a length L11*i* of a convex part 21*si* (as one example, 220 nm) is set at 440 nm. Also, as shown in FIGS. 25 and 26, in an outer periphery region Aoc (as one example, a preamble pattern formation region in the ring-shaped region A1*c* at a position 16 mm from the center O) out of the ring-shaped regions Ac, a length L13*o* that is the combined length of a length L12*o* of a concave part 22*so* (as one example, 320 nm) and a length L11*o* of a convex part 21*so* (as one example, 320 nm) is set at 640 nm. As a result, as shown in FIGS. 24 and 26, on the magnetic disk 10*c*, the ratio of the length L11*i* of the convex parts 21*si* to the length L12*i* of the concave parts 22*si* in the concave/convex pattern 20*sc* in an inner periphery region Aic inside each ring-shaped region Ac and the ratio of the length L11*o* of the convex parts 21*so* to the length L12*o* of the concave parts 22*so* in an outer periphery region Aoc inside each ring-shaped region Ac are respectively 1 in each ring-shaped region Ac.

In this case, the ratio of the length of a convex part 21*s* (the unit convex part length) to the length of a concave part 22*s* (the unit concave part length) is set in the same way not only for the preamble pattern mentioned above but also for the concave/convex pattern 20*sc* constructs the address pattern and the burst pattern. Regarding the burst pattern, in a region where a plurality of oblong convex parts 21*s* are disposed in lines on both sides on the concave parts 22*s* along the direction of rotation of the magnetic disk 10*c*, the ratio of the unit convex part length to the unit concave part length is set so that the above conditions are satisfied. It should be noted that in FIGS. 23 to 26, the preamble pattern and burst pattern in the servo pattern are schematically illustrated and for ease of understanding, the lengths of the respective convex parts 21*s* and the respective concave parts 22*s* along the direction of rotation are illustrated using the unit convex part length and unit concave part length of the servo pattern only. Accordingly, on actual magnetic disks 10*c*, the number, formation positions, and lengths of the convex parts 21*s* and the concave parts 22*s* differ to the states shown in the respective drawings, and the concave/convex pattern 20*sc* is formed with the number, formation positions, and lengths of the convex parts 21*s* and the concave parts 22*s* corresponding to the various types of control data including information (patterns) such as track addresses and sector addresses required for tracking servo control. In this case, the actual lengths of the convex parts 21s and the concave parts 22s are integer multiples of the lengths of the convex parts 21s and the concave parts 22s (i.e., integer multiples of the unit convex part length and the unit concave part length).

Also, on the magnetic disk 10c, the average length of the convex parts 21s in each ring-shaped region Ac is set so as to be equal across the entire range of the respective ring-shaped regions A1c to A4c. Accordingly, a value produced by dividing the average length of the convex parts 21s in the respective ring-shaped regions Ac by the distance from the center O of the concave/convex pattern 20t to the ring-shaped region Ac (as one example, an innermost position in the ring-shaped region Ac) decreases from the ring-shaped region A1c in the inner periphery to the ring-shaped region A4c in the outer periphery. Here, the length at the inner periphery along the direction of rotation in each ring-shaped region Ac is slightly longer for the ring-shaped regions Ac in the outer periphery of the magnetic disk 10c. More specifically, as shown in FIG. 22, as one example, a length L93i in the inner periphery along the direction of rotation in the ring-shaped region A3c is slightly longer than a length L92i in the inner periphery along the direction of rotation in the ring-shaped region A2c. In addition, the length of the outer periphery in the direction of rotation in each ring-shaped region Ac becomes slightly shorter toward the ring-shaped regions Ac in the outer periphery of the magnetic disk 10c. More specifically, as one example, a length in the outer periphery along the direction of rotation in the ring-shaped region A3c is slightly shorter than a length in the outer periphery along the direction of rotation in the ring-shaped region A2c. It should be noted that since the method of manufacturing the magnetic disk 10c is the same as the method of manufacturing the magnetic disk 10a described above, description thereof has been omitted. In this case, when the magnetic disk 10c is manufactured by imprinting, a stamper 35c (see FIG. 15) on which a concave/convex pattern 39 including concave parts 39b corresponding to the convex parts 21 in the concave/convex pattern 20 of the magnetic disk 10c and convex parts 39a corresponding to the concave parts 22 in the concave/convex pattern 20 of the magnetic disk 10c are formed may be used.

On the magnetic disk 10c, as described above the average length of the convex parts 21s inside each ring-shaped region Ac is set equal for every region out of the ring-shaped regions A1c to A4c. Accordingly, by carrying out the ion beam etching process on the non-magnetic material 15 during the manufacturing of the magnetic disk 10c until the upper surfaces of the respective convex parts 21so in the outer periphery of the ring-shaped regions Ac in the inner periphery are exposed from the non-magnetic material 15, the upper surfaces of the respective convex parts 21si in the ring-shaped region Ac are exposed from the non-magnetic material 15, the upper surfaces of the respective convex parts 21so in the outer periphery of the ring-shaped regions Ac in the outer periphery, and the upper surfaces of the respective convex parts 21si in the inner periphery of such ring-shaped regions Ac are exposed from the non-magnetic material 15 (i.e., the upper surfaces of the convex parts 21si, 21so in the ring-shaped regions Ac in the inner periphery and the ring-shaped regions Ac in the outer periphery are exposed at substantially the same time). Accordingly, on the magnetic disk 10c, the non-magnetic material 15 (residue) on the convex parts 21s is removed across every ring-shaped region Ac. For this reason, the height difference between the convexes and concaves on the surface of the magnetic disk 10c is substantially uniform in every ring-shaped region Ac. For this reason, the flying height of the magnetic head 3 (slider) is substantially constant across the entire range from the inner periphery to the outer periphery of the magnetic disk 10c, which makes stabilized recording and reproducing possible.

Also, on the magnetic disk 10c, as described above, by forming the concave/convex pattern 20sc (servo pattern) so that the combined length of the length of the convex parts 21s and the length of the concave parts 22s along the direction of rotation (that is, the formation pitch of the convex parts 21s and the concave parts 22s) increases in each ring-shaped region Ac from the inner periphery to the outer periphery in proportion to the distance from the center O of the concave/convex pattern 20t, it is possible to reliably read (detect) the servo data Ds from the servo pattern region Asc from the inner periphery to the outer periphery in each ring-shaped region Ac while rotating the magnetic disk 10c at a fixed angular velocity and without changing the read frequency information that is a reference for the clock used when reading the servo data Ds from the servo pattern region Asc within the same ring-shaped region Ac. Also, since the concave/convex pattern 20sc (servo pattern) is formed by setting the unit convex part length and the unit concave part length along the direction of rotation so as to increase from the inner periphery to the outer periphery in each ring-shaped region Ac in proportion to the distance from the center O of the concave/convex pattern 20t, the time that the convex parts 21s of the unit convex part length and the concave parts 22s of the unit concave part length pass below the magnetic head 3 is equal in the inner periphery and the outer periphery inside each ring-shaped region Ac. Accordingly, it is possible to make the signal waveform of the unit convex part length and the unit concave part length of the servo data detected by the magnetic head 3 equal across the entire range from the inner periphery to the outer periphery inside each ring-shaped region Ac. For this reason, the servo data Ds can be read even more reliably.

In this way, on the magnetic disk 10c, the concave/convex pattern 20sc (servo pattern) is formed by setting the unit convex part length and the unit concave part length so that in each ring-shaped region Ac, the unit convex part length increases from the inner periphery to the outer periphery of the ring-shaped region Ac in proportion to the distance from the center O of the concave/convex pattern 20t and the combined length of the unit convex part length and the unit concave part length increases from the inner periphery to the outer periphery of the ring-shaped region Ac in proportion to the distance from the center O of the concave/convex pattern 20t. Accordingly, according to the magnetic disk 10c and the hard disk drive 1, the servo data can be read while avoiding the situation where the length along the direction of rotation of the convex parts 21s in the ring-shaped region Ac in the outer periphery becomes long and without changing the frequency of the read frequency information in each single ring-shaped region Ac, and therefore it is possible to make a frequency switching process for the read frequency unnecessary when carrying out a seek operation for the magnetic head 3 from the inner periphery to the outer periphery within a ring-shaped region Ac. Since seek operations can be carried out in a short time, data can be accessed at high speed. Also, since it is sufficient to output a number of types of frequency information corresponding to the number (in this example, four) of ring-shaped regions as the read frequency information, it is possible to carry out a tracking servo using the detection clock output unit 5 and the control unit 8 that have simple constructions.

It should be noted that the present invention is not limited to the above structures. For example, although an example has been described where the concave/convex patterns 20sa, 20sb are formed so that the lengths (the lengths L1i, L1o, the lengths L6*i*, L6*o*) of the respective convex parts 21*s* along the direction of rotation are equal across the entire range from the inner periphery to the outer periphery within the ring-shaped regions Aa and Ab, the concave/convex pattern 20*sa* can be formed so that the lengths of the respective convex parts 21*s* slightly differ at positions from the inner periphery to the outer periphery in the ring-shaped regions. More specifically, it is possible to use a structure where the length along the direction of rotation of the convex parts 21*so* in the outer periphery of each ring-shaped region is slightly longer than the length of the convex parts 21*si* in the inner periphery of each ring-shaped region. Even with this structure where the lengths of the convex parts 21*s* differ, by forming the concave/convex patterns 20*sa*, 20*sb* with the unit convex part length set so that the length of the convex parts 21*so* in the outer periphery is shorter than the length L1*xo* of the convex parts 21*sxo* on the conventional magnetic disk 10*x*, it is possible to form the residue on the convex parts 21*so* in the outer periphery sufficiently thinly, and therefore favorable smoothness can be maintained in the outer periphery within the ring-shaped regions Aa and Ab.

Figure 27:
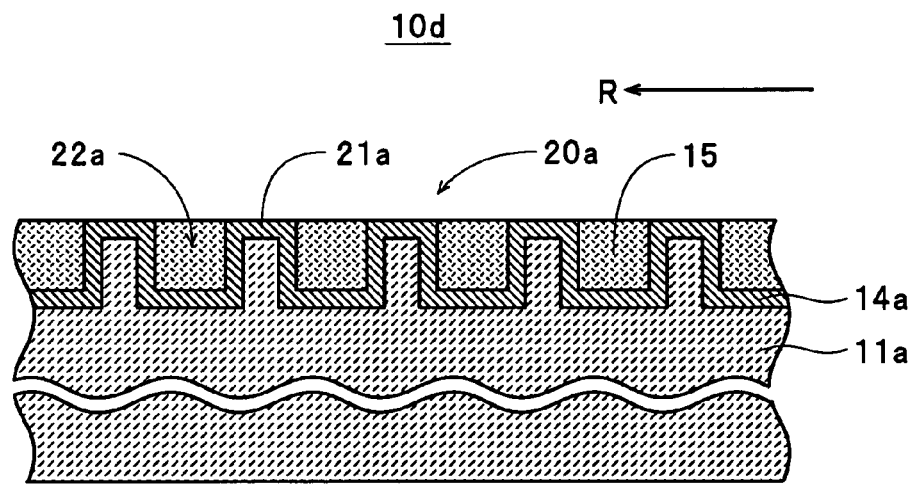
FIG. 27 is a cross-sectional view showing the multilayer structure of the further magnetic disk.
Figure 28:
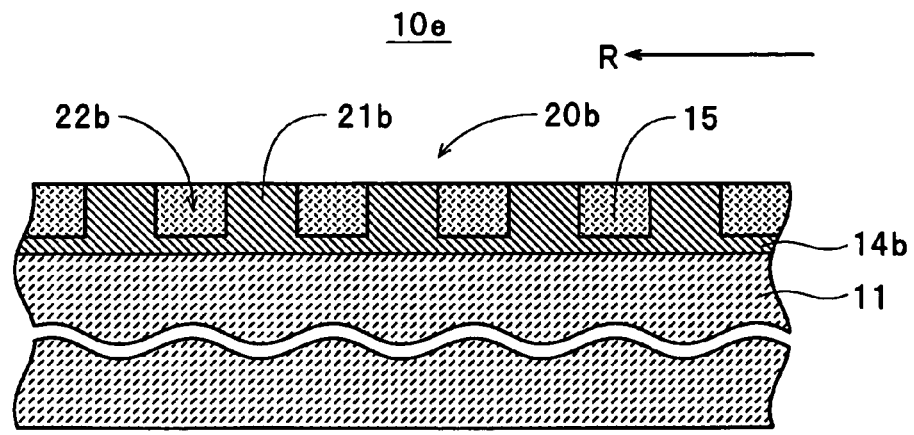
FIG. 28 is a cross-sectional view showing the multilayer structure of the still further magnetic disk.
Figure 29:
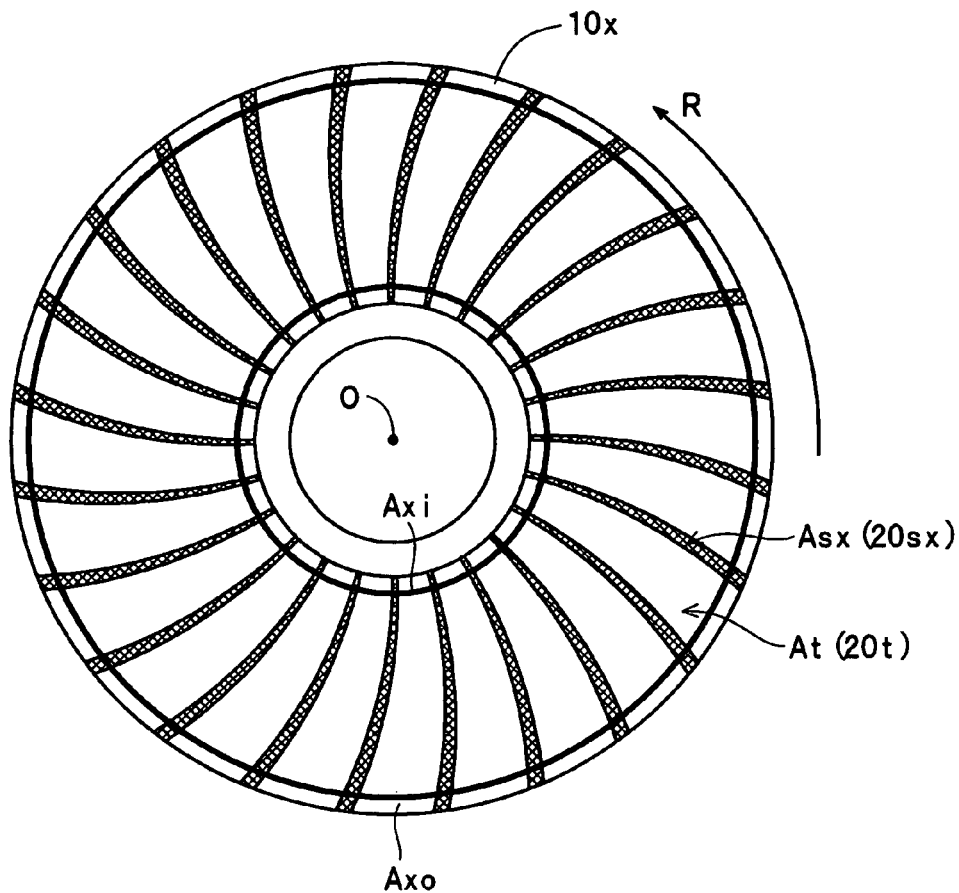
FIG. 29 is a plan view of a conventional magnetic disk.
Figure 30:
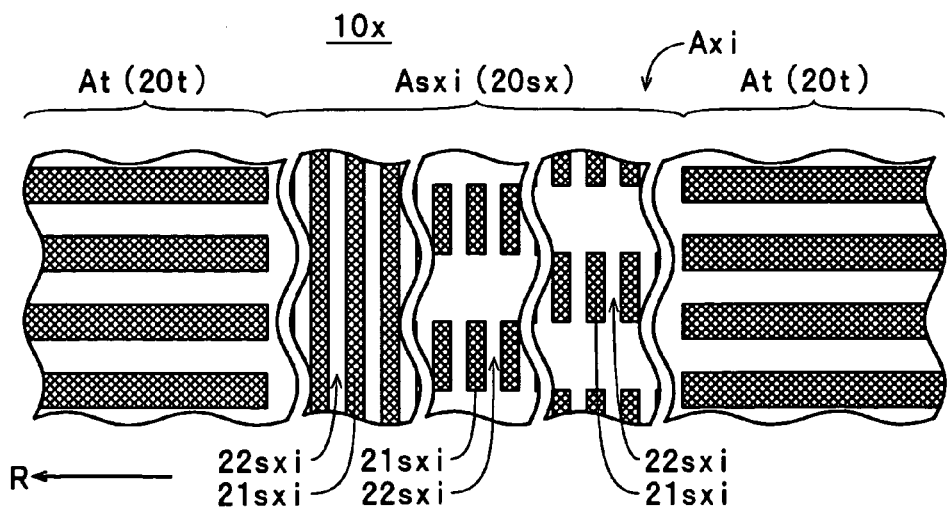
FIG. 30 is a plan view of an inner periphery region of the conventional magnetic disk.
Figure 31:
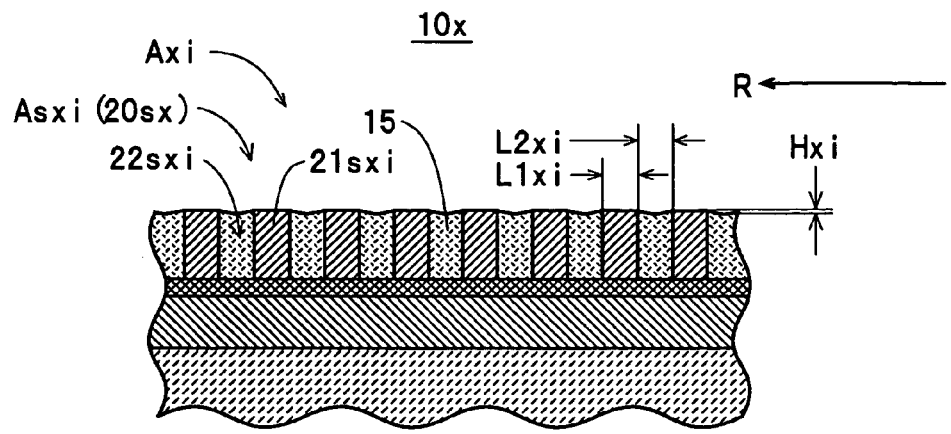
FIG. 31 is a cross-sectional view of an inner periphery servo pattern region in the inner periphery region shown in FIG. 30.
Figure 32:
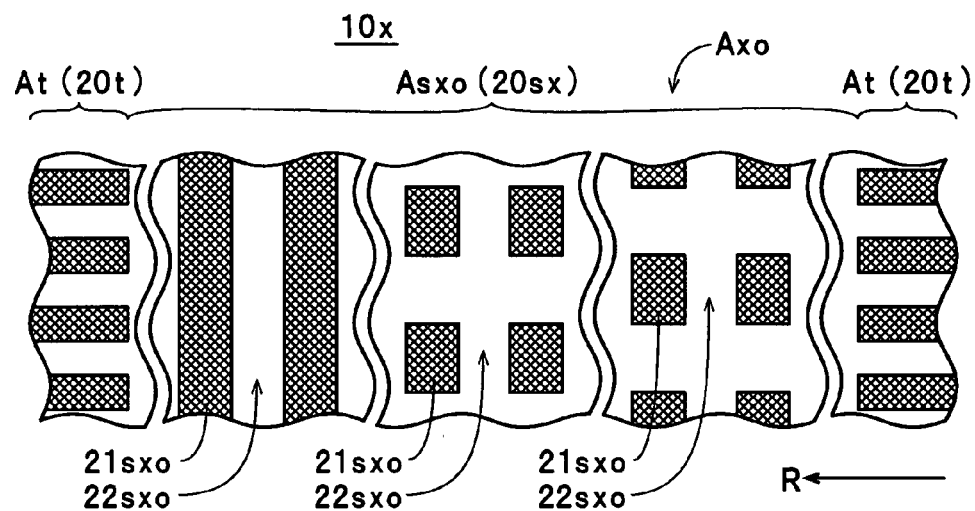
FIG. 32 is a plan view of an outer periphery region of the conventional magnetic disk.
Figure 33:
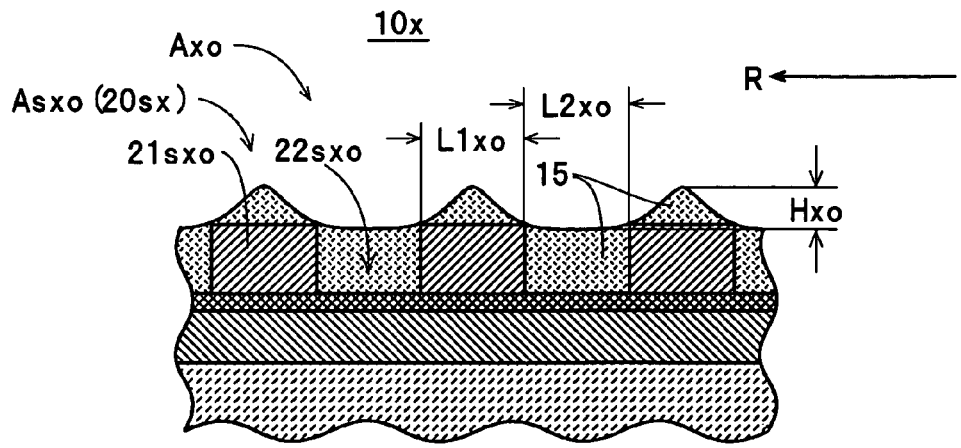
FIG. 33 is a cross-sectional view of an outer periphery servo pattern region in the outer periphery region shown in FIG. 32.

In addition, the servo pattern of the present invention is not limited to the example described above, and it is possible to form the servo pattern by setting the unit convex part length and the unit concave part length so that the concave/convex form of the concave/convex patterns 20*sa* to 20*sc* in the servo pattern regions Asa to Asc of the magnetic disks 10*a* to 10*c* is reversed and so that the various conditions for the present invention are satisfied. Also, although the respective convex parts 21 of the concave/convex pattern 20 are formed of magnetic material from the bottom ends to the top ends on the magnetic disks 10*a* to 10*c* described above, the present invention is not limited to this and by forming a magnetic layer 14*a* so as to cover a concave/convex pattern formed in the substrate 11*a* as in the magnetic disk 10*d* shown in FIG. 27, it is possible to construct a concave/convex pattern 20*a* with convex parts 21*a* whose surfaces are formed by a magnetic layer 14*a* and concave parts 22*a* whose bottom surfaces are also formed by the magnetic layer 14*a*. In this case, in the same way as the method of forming the concave/convex pattern 20 on the magnetic disk 10*a* and the like described above, the concave/convex pattern of the substrate 11*a* can be formed by etching the substrate 11*a* using the concave/convex pattern 43 that was used as a mask when etching the magnetic layer 14, for example. The concave/convex pattern of the substrate 11*a* can also be formed by press molding or injection molding using a stamper in the same way as the stampers 35*a* to 35*c*, for example. In addition, in the same way as the magnetic disk 10*e* shown in FIG. 28, it is possible to construct a concave/convex pattern 20*b* of a continuous magnetic layer 14*b* that constructs the respective convex parts 21*b* and bottom surfaces of the concave parts 22*b* between the respective convex parts 21*b*. Also, although the magnetic disks 10*a* to 10*c* are magnetic disks for perpendicular recording, it is also possible to apply the present invention to magnetic disks for longitudinal recording.

What is claimed is:

1. An information recording medium where a data track pattern and a servo pattern composed of a concave/convex pattern including a plurality of convex parts are formed on at least one surface side of a substrate and respective concave parts in the concave/convex pattern are filled with non-magnetic material,
wherein in the concave/convex pattern that constructs the data track pattern, the respective convex parts are formed concentrically or in a spiral, and
the concave/convex pattern that constructs the servo pattern is divided into a plurality of ring-shaped regions that are concentric with the data track pattern and has a unit convex part length along a direction of rotation of the substrate set in each ring-shaped region so that a value produced by dividing an average length of the unit convex part length in each ring-shaped region by a distance from a center of the data track pattern to the ring-shaped region decreases from ring-shaped regions in an inner periphery to ring-shaped regions in an outer periphery.

2. An information recording medium according to claim 1, wherein in the concave/convex pattern that constructs the servo pattern, the unit convex part length and a unit concave part length along the direction of rotation of the substrate are set so that a ratio of the unit convex part length to the unit concave part length decreases in each ring-shaped region from the inner periphery of the ring-shaped region to the outer periphery of the ring-shaped region.

3. An information recording medium according to claim 2, wherein in the concave/convex pattern that constructs the servo pattern, the unit concave part length is set so as to increase in each ring-shaped region from the inner periphery of the ring-shaped region to the outer periphery of the ring-shaped region.

4. An information recording medium according to claim 2, wherein in the concave/convex pattern that constructs the servo pattern, the unit convex part length is set in each ring-shaped region at an equal or substantially equal length in an entire range from the inner periphery of the ring-shaped region to the outer periphery of the ring-shaped region.

5. An information recording medium according to claim 2, wherein in the concave/convex pattern that constructs the servo pattern, a combined length of the unit convex part length and the unit concave part length is set so as to increase in each ring-shaped region from the inner periphery of the ring-shaped region to the outer periphery of the ring-shaped region in proportion to a distance from the center of the data track pattern.

6. An information recording medium according to claim 2, wherein in the concave/convex pattern that constructs the servo pattern, the average length of the unit convex part length in each ring-shaped region is set at an equal or substantially equal length in an entire range from ring-shaped regions in the inner periphery to ring-shaped regions in the outer periphery.

7. An information recording medium according to claim 1, wherein in the concave/convex pattern that constructs the servo pattern, the unit convex part length is set so as to increase in each ring-shaped region from the inner periphery of the ring-shaped region to the outer periphery of the ring-shaped region in proportion to a distance from the center of the data track pattern and the unit concave part length and the unit convex part length along the direction of rotation of the substrate are set so that a combined length of the unit concave part length and the unit convex part length increases in each ring-shaped region from the inner periphery of the ring-shaped region to the outer periphery of the ring-shaped region in proportion to the distance from the center of the data track pattern.

8. An information recording medium according to claim 1, wherein in the concave/convex pattern that constructs the servo pattern, the unit convex part length is set so that a value produced by dividing the unit convex part length by a distance from the center of the data track region decreases in each ring-shaped region from the inner periphery of the ring-shaped region to the outer periphery of the ring-shaped region.

9. An information recording medium according to claim 8, wherein in the concave/convex pattern that constructs the servo pattern, the unit concave part length is set so that a value produced by dividing the unit concave part length along a direction of rotation of the substrate by a distance from the center of the data track region decreases in each ring-shaped region from the inner periphery of the ring-shaped region to the outer periphery of the ring-shaped region.

10. An information recording medium according to claim 8, wherein in the concave/convex pattern that constructs the servo pattern, the unit convex part length is set at an equal or substantially equal length in an entire range in each ring-shaped region from the inner periphery of the ring-shaped region to the outer periphery of the ring-shaped region.

11. An information recording medium according to claim 8, wherein in the concave/convex pattern that constructs the servo pattern, the unit concave part length is set at an equal or substantially equal length in an entire range in each ring-shaped region from the inner periphery of the ring-shaped region to the outer periphery of the ring-shaped region.

12. A recording/reproducing apparatus comprising an information recording medium according to claim 8 and a control unit that carries out servo control by reading servo data corresponding to the servo pattern from the information recording medium based on read frequency information set in advance in accordance with a distance from the center of the data track pattern.

13. A recording/reproducing apparatus comprising an information recording medium according to claim 1 and a control unit that carries out servo control based on servo data corresponding to the servo pattern.

14. A recording/reproducing apparatus comprising an information recording medium according to claim 1 and a control unit that carries out servo control by reading servo data corresponding to the servo pattern from the information recording medium based on read frequency information set in advance for each ring-shaped region.

15. A recording/reproducing apparatus comprising an information recording medium according to claim 1 and a control unit that carries out servo control by reading servo data corresponding to the servo pattern from the information recording medium based on read frequency information set in advance in accordance with a distance from the center of the data track pattern.

16. A stamper for manufacturing an information recording medium, on which is formed a concave/convex pattern including convex parts formed corresponding to concave parts in the concave/convex pattern of an information recording medium according to claim 1 and concave parts formed corresponding to convex parts in the concave/convex pattern of the information recording medium.

* * * * *